United States Patent
Aron et al.

(10) Patent No.: US 11,314,421 B2
(45) Date of Patent: *Apr. 26, 2022

(54) METHOD AND SYSTEM FOR IMPLEMENTING WRITABLE SNAPSHOTS IN A VIRTUALIZED STORAGE ENVIRONMENT

(71) Applicant: Nutanix, Inc., San Jose, CA (US)

(72) Inventors: Mohit Aron, Saratoga, CA (US); Brian Byrne, San Jose, CA (US)

(73) Assignee: Nutanix, Inc., San Jose, CA (US)

(*) Notice: Subject to any disclaimer, the term of this patent is extended or adjusted under 35 U.S.C. 154(b) by 225 days.

This patent is subject to a terminal disclaimer.

(21) Appl. No.: 16/518,211

(22) Filed: Jul. 22, 2019

(65) Prior Publication Data

US 2019/0339883 A1    Nov. 7, 2019

Related U.S. Application Data

(63) Continuation of application No. 14/684,901, filed on Apr. 13, 2015, now Pat. No. 10,359,952, which is a
(Continued)

(51) Int. Cl.
    *G06F 16/182*      (2019.01)
    *G06F 3/06*      (2006.01)
    (Continued)

(52) U.S. Cl.
CPC ............ *G06F 3/0619* (2013.01); *G06F 3/065* (2013.01); *G06F 3/067* (2013.01); *G06F 3/0611* (2013.01); *G06F 3/0626* (2013.01); *G06F 3/0683* (2013.01); *G06F 11/14* (2013.01); *G06F 12/12* (2013.01); *G06F 16/00* (2019.01); *G06F 16/128* (2019.01); *G06F 16/182* (2019.01); *G06F 2201/84* (2013.01)

(58) Field of Classification Search
CPC .......... G06F 11/14; G06F 12/12; G06F 17/30; G06F 3/0611; G06F 3/0626; G06F 3/065; G06F 3/067; G06F 3/0683; G06F 16/182; G06F 16/128
See application file for complete search history.

(56) References Cited

U.S. PATENT DOCUMENTS

| | | |
|---|---|---|
| 4,980,822 A | 12/1990 | Brantley, Jr. |
| 6,834,386 B1 | 12/2004 | Douceur et al. |

(Continued)

FOREIGN PATENT DOCUMENTS

WO    WO 2010117294    10/2010

OTHER PUBLICATIONS

Non-Final Office Action dated Jul. 31, 2020 for related U.S. Appl. No. 16/404,736.
(Continued)

*Primary Examiner* — Taelor Kim
(74) *Attorney, Agent, or Firm* — Vista IP Law Group, LLP

(57) ABSTRACT

Disclosed is an improved approach for implementing and maintaining writable snapshots. An efficient approach is provided for implementing snapshots that can be used to immediately create snapshots without incurring any detectable delays in providing access to the new snapshots. Also described are improved metadata structures that can be used to implement and maintain the writable snapshots.

24 Claims, 17 Drawing Sheets

Related U.S. Application Data continuation of application No. 13/207,371, filed on Aug. 10, 2011, now Pat. No. 9,009,106.

(51) Int. Cl.
*G06F 12/12* (2016.01)
*G06F 11/14* (2006.01)
*G06F 16/00* (2019.01)
*G06F 16/11* (2019.01)

(56) References Cited

U.S. PATENT DOCUMENTS

| | | |
|---|---|---|
| 7,035,881 B2 | 4/2006 | Tummala et al. |
| 7,360,034 B1 | 4/2008 | Muhlestein et al. |
| 7,970,851 B2 | 6/2011 | Ponnappan et al. |
| 8,089,795 B2 | 1/2012 | Rajan et al. |
| 8,099,572 B1 | 1/2012 | Arora et al. |
| 8,145,842 B2 | 3/2012 | Shiga |
| 8,194,674 B1 | 6/2012 | Pagel et al. |
| 8,407,265 B1 | 3/2013 | Scheer et al. |
| 8,413,146 B1 | 4/2013 | McCorkendale et al. |
| 8,438,346 B2 | 5/2013 | Gold |
| 8,539,484 B1 | 9/2013 | Offer |
| 8,549,518 B1 | 10/2013 | Aron et al. |
| 8,566,821 B2 | 10/2013 | Robinson et al. |
| 8,601,473 B1 | 12/2013 | Aron et al. |
| 8,683,153 B1 | 3/2014 | Long et al. |
| 8,850,130 B1 | 9/2014 | Aron et al. |
| 8,910,156 B1 | 12/2014 | Kenchammana-Hosekote et al. |
| 8,949,829 B1 | 2/2015 | Xing |
| 9,256,475 B1 | 2/2016 | Aron et al. |
| 9,772,866 B1 | 9/2017 | Aron et al. |
| 2002/0002448 A1 | 1/2002 | Kampe |
| 2002/0091574 A1 | 7/2002 | Lefebvre et al. |
| 2002/0124137 A1 | 9/2002 | Ulrich et al. |
| 2002/0161889 A1 | 10/2002 | Gamache et al. |
| 2002/0184239 A1 | 12/2002 | Mosher et al. |
| 2003/0046369 A1 | 3/2003 | Sim et al. |
| 2003/0154236 A1 | 8/2003 | Dar et al. |
| 2003/0158873 A1* | 8/2003 | Sawdon ............... G06F 16/10 |
| 2003/0202486 A1 | 10/2003 | Anton et al. |
| 2004/0107227 A1 | 6/2004 | Michael |
| 2004/0139128 A1 | 7/2004 | Becker et al. |
| 2004/0148380 A1 | 7/2004 | Meyer |
| 2004/0158566 A1* | 8/2004 | Chong, Jr. ......... G06F 11/1466 |
| 2004/0221089 A1 | 11/2004 | Sato et al. |
| 2005/0027956 A1* | 2/2005 | Tormasov ........... G06F 11/1451 |
| | | 711/162 |
| 2005/0065985 A1 | 3/2005 | Tummala et al. |
| 2005/0102672 A1 | 5/2005 | Brothers |
| 2006/0005189 A1 | 1/2006 | Vega et al. |
| 2006/0106999 A1 | 5/2006 | Baldwin |
| 2006/0112093 A1 | 5/2006 | Lightstone et al. |
| 2006/0123062 A1 | 6/2006 | Bobbitt et al. |
| 2006/0126918 A1 | 6/2006 | Oohashi et al. |
| 2006/0155930 A1 | 7/2006 | Birrell |
| 2006/0167886 A1 | 7/2006 | Kantesaria et al. |
| 2006/0179261 A1 | 8/2006 | Rajan |
| 2006/0184349 A1 | 8/2006 | Goud et al. |
| 2007/0050767 A1 | 3/2007 | Grobman et al. |
| 2007/0156955 A1 | 7/2007 | Royer, Jr. et al. |
| 2007/0239942 A1 | 10/2007 | Rajwar et al. |
| 2007/0244938 A1 | 10/2007 | Michael et al. |
| 2008/0183973 A1 | 7/2008 | Aguilera et al. |
| 2008/0189468 A1 | 8/2008 | Schmidt |
| 2008/0189700 A1 | 8/2008 | Schmidt et al. |
| 2008/0196043 A1 | 8/2008 | Feinleib et al. |
| 2008/0201709 A1 | 8/2008 | Hodges |
| 2008/0222234 A1 | 9/2008 | Marchand |
| 2008/0244028 A1 | 10/2008 | Le et al. |
| 2008/0263407 A1 | 10/2008 | Yamamoto |
| 2008/0270564 A1 | 10/2008 | Rangegowda et al. |
| 2008/0282047 A1 | 11/2008 | Arakawa et al. |
| 2009/0172165 A1 | 7/2009 | Rokuhara et al. |
| 2009/0172660 A1 | 7/2009 | Klotz et al. |
| 2009/0183159 A1 | 7/2009 | Michael et al. |
| 2009/0222542 A1 | 9/2009 | Miyajima |
| 2009/0259759 A1 | 10/2009 | Miyajima |
| 2009/0276467 A1 | 11/2009 | Scholtes et al. |
| 2009/0300660 A1 | 12/2009 | Solomon et al. |
| 2009/0313391 A1 | 12/2009 | Watanabe |
| 2010/0037243 A1 | 2/2010 | Mo et al. |
| 2010/0070470 A1 | 3/2010 | Milencovici et al. |
| 2010/0070725 A1 | 3/2010 | Prahlad et al. |
| 2010/0106907 A1 | 4/2010 | Noguchi |
| 2010/0115174 A1 | 5/2010 | Akyol et al. |
| 2010/0125842 A1 | 5/2010 | Friedman et al. |
| 2010/0128432 A1 | 5/2010 | Miller |
| 2010/0138827 A1 | 6/2010 | Frank et al. |
| 2010/0153514 A1 | 6/2010 | Dabagh |
| 2010/0161908 A1 | 6/2010 | Nation et al. |
| 2010/0162039 A1 | 6/2010 | Goroff et al. |
| 2010/0174820 A1 | 7/2010 | Banga et al. |
| 2010/0199276 A1 | 8/2010 | Umbehocker |
| 2010/0228903 A1 | 9/2010 | Chandrasekaran |
| 2010/0235831 A1 | 9/2010 | Dittmer |
| 2010/0251238 A1 | 9/2010 | Schuba et al. |
| 2010/0262586 A1 | 10/2010 | Rosikiewicz et al. |
| 2010/0275198 A1 | 10/2010 | Jess et al. |
| 2010/0281166 A1 | 11/2010 | Buyya et al. |
| 2010/0299368 A1 | 11/2010 | Hutchins et al. |
| 2010/0299495 A1 | 11/2010 | Frank |
| 2010/0332722 A1 | 12/2010 | Oiwa et al. |
| 2010/0332889 A1 | 12/2010 | Shneorson et al. |
| 2011/0010515 A1 | 1/2011 | Ranade |
| 2011/0016096 A1 | 1/2011 | Teerlink |
| 2011/0060759 A1 | 3/2011 | Fienblit et al. |
| 2011/0061050 A1 | 3/2011 | Sahita et al. |
| 2011/0071983 A1 | 3/2011 | Murase |
| 2011/0075674 A1 | 3/2011 | Li |
| 2011/0099551 A1 | 4/2011 | Fahrig et al. |
| 2011/0145418 A1 | 6/2011 | Pratt |
| 2011/0145534 A1 | 6/2011 | Factor et al. |
| 2011/0145916 A1 | 6/2011 | Mckenzie et al. |
| 2011/0154318 A1 | 6/2011 | Oshins et al. |
| 2011/0179413 A1 | 7/2011 | Subramanian |
| 2011/0184993 A1 | 7/2011 | Chawla et al. |
| 2011/0185292 A1 | 7/2011 | Chawala et al. |
| 2011/0202920 A1 | 8/2011 | Takase |
| 2011/0208909 A1* | 8/2011 | Kawaguchi ............ G06F 3/065 |
| | | 711/113 |
| 2011/0239213 A1 | 9/2011 | Aswani et al. |
| 2011/0245724 A1 | 10/2011 | Flatland et al. |
| 2011/0258404 A1 | 10/2011 | Arakawa et al. |
| 2011/0314469 A1 | 12/2011 | Qian et al. |
| 2011/0320556 A1 | 12/2011 | Reuther |
| 2012/0002535 A1 | 1/2012 | Droux et al. |
| 2012/0005307 A1 | 1/2012 | Das et al. |
| 2012/0011505 A1 | 1/2012 | Fujisaki et al. |
| 2012/0030676 A1 | 2/2012 | Smith et al. |
| 2012/0036134 A1 | 2/2012 | Malakhov |
| 2012/0054746 A1 | 3/2012 | Vaghani |
| 2012/0066681 A1 | 3/2012 | Levy et al. |
| 2012/0079229 A1 | 3/2012 | Jensen et al. |
| 2012/0084445 A1 | 4/2012 | Brock et al. |
| 2012/0096211 A1 | 4/2012 | Davis |
| 2012/0096461 A1 | 4/2012 | Goswami et al. |
| 2012/0102006 A1 | 4/2012 | Larson et al. |
| 2012/0102491 A1 | 4/2012 | Maharana |
| 2012/0117320 A1 | 5/2012 | Pinchover |
| 2012/0117555 A1 | 5/2012 | Banerjee |
| 2012/0124186 A1 | 5/2012 | Emerson |
| 2012/0124270 A1 | 5/2012 | Weissman et al. |
| 2012/0137098 A1 | 5/2012 | Wang et al. |
| 2012/0144229 A1 | 6/2012 | Nadolski |
| 2012/0150824 A1 | 6/2012 | Zhu et al. |
| 2012/0158674 A1 | 6/2012 | Lillibridge |
| 2012/0167079 A1 | 6/2012 | Banerjee et al. |
| 2012/0167080 A1 | 6/2012 | Vilayannur |
| 2012/0167082 A1 | 6/2012 | Kumar et al. |
| 2012/0167085 A1 | 6/2012 | Subramaniyan et al. |
| 2012/0179874 A1 | 7/2012 | Chang et al. |
| 2012/0215970 A1 | 8/2012 | Shats |
| 2012/0221529 A1 | 8/2012 | Rosikiewicz et al. |

(56) References Cited

U.S. PATENT DOCUMENTS

| | | |
|---|---|---|
| 2012/0221765 A1 | 8/2012 | Yoo et al. |
| 2012/0233668 A1 | 9/2012 | Leafe et al. |
| 2012/0254862 A1 | 10/2012 | Dong |
| 2012/0265959 A1 | 10/2012 | Le et al. |
| 2012/0266165 A1 | 10/2012 | Cen et al. |
| 2012/0272240 A1 | 10/2012 | Starks et al. |
| 2012/0272241 A1 | 10/2012 | Nonaka et al. |
| 2012/0284712 A1 | 11/2012 | Nimmagadda et al. |
| 2012/0291021 A1 | 11/2012 | Banerjee |
| 2012/0317084 A1 | 12/2012 | Liu et al. |
| 2012/0324040 A1 | 12/2012 | Velummylum et al. |
| 2013/0007219 A1 | 1/2013 | Sorenson et al. |
| 2013/0013865 A1 | 1/2013 | Venkatesh |
| 2013/0014103 A1 | 1/2013 | Reuther et al. |
| 2013/0055259 A1 | 2/2013 | Dong |
| 2013/0061014 A1 | 3/2013 | Prahlad et al. |
| 2013/0080409 A1 | 3/2013 | Akirav et al. |
| 2013/0139153 A1 | 5/2013 | Shah |
| 2013/0326053 A1 | 12/2013 | Bauer et al. |
| 2013/0332610 A1 | 12/2013 | Beveridge |
| 2014/0006731 A1 | 1/2014 | Uluski et al. |
| 2014/0007189 A1 | 1/2014 | Huynh et al. |

OTHER PUBLICATIONS

Final Office Action dated Dec. 28, 2020 for related U.S. Appl. No. 16/404,736.
Non-Final Office Action dated Jun. 29, 2021 for related U.S. Appl. No. 16/404,736.
Non-final Office Action dated Dec. 26, 2012 for U.S. Appl. No. 13/207,365.
Non-final Office Action dated Jan. 24, 2013 for U.S. Appl. No. 13/207,371.
Thekkath et al., "Frangipani: A Scalable Distributed File System", SOSP, 1997, 24 pages.
Mendel Rosenblum, "The Design and Implementation of a Log-structured File System", SOSP, 1991, 101 pages.
Birrell et al., "A Simple and Efficient Implementation for Small Databases", Aug. 11, 1987, 17 pages.
Terry et al., "Managing Update Conflicts in Bayou, a Weakly Connected Replicated Storage System", Association for Computing Machinery, 1995, 12 pages.
Mike Burrows, "The Chubby lock service for loosely-coupled distributed systems", OSDI 2006 Paper, Google Inc., Sep. 6, 2006, 23 pages.
Lee et al., "Petal: Distributed Virtual Disks" The Proceedings of the 7th International Conference on Architectural Support for Programming Languages and Operating Systems, 1996, 9 pages.
Dean et al., "MapReduce: Simplified Data Processing on Large Clusters", OSDI 2004, 6th Symposium on Operating Systems Design and Implementation, Google Inc, Oct. 3, 2004, 25 pages.
Chang et al., "Bigtable: A Distributed Storage System for Structured Data" OSDI 2006 Paper, 7th USENIX Symposium on Operating Systems Design and Implementation, 2006, 20 pages.
Ghemawat et al., "The Google File System", SOSP 2003, ACM, Bolton Landing, NY, 2003, 15 pages.
Zhu et al., "Avoiding the Disk Bottleneck in the Data Domain Deduplication File System", Data Domain, Inc., 2008, 15 pages.
DeCandia et al., "Dynamo: Amazon's Highly Available Key-value Store", Proceedings of the 21st ACM Symposium on Operating Systems Principles, Oct. 2007, 16 pages.
Project Voldemort, A distributed database, Jan. 9, 2013, from: http://www.project-voldemort.com/voldemort/.
Bernstein et al., "Concurrency Control and Recovery in Database Systems", Addison-Wesley 1987, 35 pages.
Weikum et al., "Transactional Information Systems: Theory, Algorithms, and the Practice of Concurrency Control and Recovery", 2002, 91 pages.
Timothy L. Harris, "A Pragmatic Implementation of Non-Blocking Linked-Lists", 2001, 15 pages.
Lakshman et al., "Cassandra—A Decentralized Structured Storage System", LADIS, 2009, 6 pages.
"Open iSCSI", Project: Open-iSCSI—RFC3720 architecture and implementation, 2005, from http://www.open-iscsi.org.
"Chunkfs", Aug. 22, 2009, from: http://valerieaurora.org/chunkfs/.
"Hypertable", Hypertable Inc., Oct. 28, 2012, from http://hypertable.org/.
MacCormick et al., "Boxwood: Abstractions as the Foundation for Storage Infrastructure" OSDI 2004, Microsoft Research Silicon Valley, 31 pages.
Robert Hagmann, "Reimplementing the Cedar File System Using Logging and Group Commit", ACM, 1987, 8 pages.
Sherman et al., "ACMS: The Akamai Configuration Management System" NSDI, 2005, 22 pages.
Petersen et al., "Flexible Update Propagation for Weakly Consistent Replication", SOSP, 1997, 19 pages.
Banga et al., "Resource containers: A new facility for resource management in server systems" Proceedings of the 3rd USENIX Symposium on ODSI, 1999, 15 pages.
F. Mattern, "Virtual Time and Global States of Distributed Systems" Proceedings of the International Workshop on Parallel and Distributed Algorithms, 1989, 15 pages.
Maged M. Michael, "High Performance Dynamic Lock-Free Hash Tables and List-Based Sets" SPAA 2002, Aug. 2002, 10 pages.
Welsh et al., "SEDA: An Architecuture for Well-Conditioned, Scalable Internet Services" Proceedings of the Eighteenth Symposium on Operating Systems Principles, Oct. 2001, 15 pages.
Notice of Allowance and Fees Due dated Apr. 8, 2013 for U.S. Appl. No. 13/207,365.
Non-final Office Action dated Apr. 11, 2013 for U.S. Appl. No. 13/207,345.
Final Office Action dated Jun. 27, 2013 for U.S. Appl. No. 13/207,371.
Notice of Allowance and Fees Due dated Aug. 23, 2013 for U.S. Appl. No. 13/207,345.
Non-final Office Action dated Jan. 27, 2014 for U.S. Appl. No. 13/571,188.
Non-final Office Action dated Apr. 24, 2014, for U.S. Appl. No. 13/744,655.
Notice of Allowance and Fees Due dated May 23, 2014 for U.S. Appl. No. 13/207,357.
Non-Final Office Action dated May 16, 2014 for U.S. Appl. No. 13/744,649.
Notice of Allowance dated Jun. 11, 2014 for U.S. Appl. No. 13/571,188.
Non-final Office Action dated Aug. 26, 2014 for U.S. Appl. No. 13/744,668.
Corrected Notice of Allowance dated Sep. 5, 2014 for U.S. Appl. No. 13/207,357.
Non-final Office Action dated Sep. 26, 2014 for U.S. Appl. No. 13/947,668.
Non-final Office Action dated Oct. 2, 2014 for U.S. Appl. No. 13/564,511.
Non-final Office Action dated Oct. 16, 2014 for U.S. Appl. No. 13/744,683.
Final Office Action dated Nov. 3, 2014, for U.S. Appl. No. 13/744,649.
Final Office Action dated Nov. 3, 2014, for U.S. Patent Application No. 13/744,655.
Non-final Office Action dated Nov. 6, 2014, for U.S. Appl. No. 13/744,693.
Notice of Allowance and Fees Due dated Nov. 21, 2014, for U.S. Appl. No. 13/744,703.
Notice of Allowance and fees Due dated Dec. 1, 2014 for U.S. Appl. No. 13/207,371.
Final Office Action dated Jan. 30, 2015 for U.S. Appl. No. 13/564,511.
Notice of Allowance and Fee(s) Due dated Feb. 6, 2015 for U.S. Appl. No. 13/744,683.
Final Office Action dated Feb. 12, 2015 for U.S. Appl. No. 13/744,668.
Non-final Office Action dated Feb. 23, 2015 for U.S. Appl. No. 13/744,649.
Non-final Office Action dated Feb. 24, 2015 for U.S. Appl. No. 13/830,116.
Non-final Office Action dated Mar. 5, 2015 for U.S. Appl. No. 13/744,655.

(56) References Cited

OTHER PUBLICATIONS

Non-final Office Action dated Mar. 11, 2015 for U.S. Appl. No. 13/551,291.
Non-final Office Action dated Mar. 12, 2015 for U.S. Appl. No. 14/514,326.
Final Office Action dated Apr. 9, 2015 for U.S. Appl. No. 13/744,693.
Notice of Allowance and Fee(s) Due dated Apr. 22, 2015 for U.S. Appl. No. 14/500,730.
Non-final Office Action dated Apr. 27, 2015 for U.S. Appl. No. 14/500,752.
Final Office Action dated May 5, 2015 for U.S. Appl. No. 13/947,668.
Non-final Office Action dated May 6, 2015 for U.S. Appl. No. 13/564,511.
Non-final Office Action dated Jun. 1, 2015 for U.S. Appl. No. 13/744,668.
Final Office Action dated Jun. 5, 2015 for U.S. Appl. No. 13/744,649.
Final Office Action dated Aug. 14, 2015 for related U.S. Appl. No. 13/830,116.
Non-final Office Action dated Aug. 25, 2015 for related U.S. Appl. No. 13/744,693.
Final Office Action dated Aug. 26, 2015 for related U.S. Appl. No. 13/744,655.
Notice of Allowance and Fee(s) due dated Sep. 15, 2015 for related U.S. Appl. No. 14/500,730.
Non-final Office Action dated Sep. 17, 2015, for related U.S. Appl. No. 13/744,649.
Notice of Allowance and fees due dated Sep. 30, 2015, for related U.S. Appl. No. 14/514,326.
Final Office Action dated Oct. 1, 2015 for related U.S. Appl. No. 13/551,291.
Notice of Allowance and Fees due dated Oct. 2, 2015 for related U.S. Appl. No. 13/744,668.
Final Office Action dated Nov. 20, 2015 for related U.S. Appl. No. 13/564,511.
Non-final Office Action dated Dec. 31, 2015 for related U.S. Appl. No. 13/830,116.
Nigmandjanovich et al., "Policy-based dynamic resource allocation for virtual machines on Xen-enabled virtualization environment", IEEE, 2010, pp. 353-355.
Bolte et al., "Non-intrusive Virtualization Management using Libvert", EDAA 2010, pp. 574-577.
Final Office Action dated Jan. 6, 2016 for related U.S. Appl. No. 14/500,752.
Corrected Notice of Allowance dated Jan. 11, 2016 for U.S. Appl. No. 14/500,730.
Notice of Allowability dated Jan. 20, 2016 for related U.S. Appl. No. 13/947,668.
Non-final Office Action dated Jan. 25, 2016 for related U.S. Appl. No. 13/744,655.
Non-final Office Action dated Feb. 12, 2016 for related U.S. Appl. No. 13/551,291.
Notice of Allowance and Fee(s) Due dated Mar. 8, 2016 for related U.S. Appl. No. 13/744,649.
Non-final Office Action dated Mar. 10, 2016 for related U.S. Appl. No. 13/564,511.
Final Office Action dated Mar. 28, 2016 for related U.S. Appl. No. 13/744,693.
Notice of Allowance and Fee(s) due dated Jun. 14, 2016 for related U.S. Appl. No. 13/744,655.
Final Office Action dated Jul. 29, 2016 for related U.S. Appl. No. 13/830,116.
Final Office Action dated Aug. 12, 2016 for related U.S. Appl. No. 13/551,291.
Notice of Allowance and Fee(s) due dated Sep. 6, 2016 for related U.S. Appl. No. 13/744,693.
Notice of Allowance and Fee(s) due dated Sep. 26, 2016 for related U.S. Appl. No. 13/744,655.
Final Office Action dated Oct. 25, 2016 for related U.S. Appl. No. 13/564,511.
Non-final Office Action dated Dec. 13, 2016 for related U.S. Appl. No. 13/551,291.
Notice of Allowance and Fees Due dated Jan. 6, 2017 for related U.S. Appl. No. 13/830,116.
Notice of Allowance and Fees Due dated Apr. 5, 2017 for related U.S. Appl. No. 13/564,511.
Notice of Allowance and Fees Due dated May 24, 2017 for related U.S. Appl. No. 13/551,291.
Non-Final Office Action dated Oct. 24, 2017 for related U.S. Appl. No. 14/684,901, 13 pages.
Final Office Action dated May 14, 2018 for related U.S. Appl. No. 14/684,901, 11 pages.
Non-Final Office Action dated Aug. 16, 2018 for related U.S. Appl. No. 15/436,196, 12 pages.
Non-Final Office Action dated Sep. 20, 2018 for related U.S. Appl. No. 14/684,901, 12 pages.
Non-Final Office Action dated Nov. 15, 2018 for related U.S. Appl. No. 15/714,880, 13 pages.
Final Office Action dated Feb. 11, 2019 for related U.S. Appl. No. 15/436,196, 7 pages.
Poitras, Steven. "TheNutanix Bible" (Oct. 15, 2013), from http://stevenpoitras.com/the-nutanix-bible/ (Publication date based on indicated capture date by Archive.org; first publication date unknown).
Poitras, Steven. "TheNutanixBible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "TheNutanix Bible" (Sep. 4, 2015), from https://nutanixbible.com/.
Poitras, Steven. "The Nutanix Bible" (Jan. 12, 2016), from https://nutanixbible.com/.
Poitras, Steven. "TheNutanix Bible" (Jun. 9, 2016), from https://nutanixbible.com/.
Poitras, Steven. "The Nutanix Bible" (Jan. 3, 2017), from https://nutanixbible.com/.
Poitras, Steven "TheNutanix Bible" (Jun. 8, 2017), from https://nutanixbible.com/.
Poitras, Steven "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Notice of Allowance dated Apr. 24, 2019 for related U.S. Appl. No. 14/684,901, 9 pages.
Final Office Action dated May 8, 2019 for related U.S. Appl. No. 15/714,880, 16 pages.
Oracle, "Maximize Value from IT Assets: No-Cost Virtualization and Consolidation from Oracle", (Mar. 13, 2011) date captured by Archive.org, from http://www.oracle.com/us/products/servers-storage/servers/x86/consolidation-virtualization-brief-301206.pdf.
Okano, "Future Trends of BladeServer: Virtualization and Optimization", (Apr. 30, 2004), NEC Journal of Advanced Technology, vol. 1, No. 2.
Cisco, "A Platform Built for Server Virtualization: Cisco Unified Computing System", (Dec. 2009).
Hess, K., "7 Blade Server Solutions to Transform Your Data Center", (Dec. 12, 2011), SeverWatch, from https://www.serverwatch.com/server-trends/7-blade-server-solutions-to-transform-your-data-center.html.
Godsey, L., "Blade Servers vs. Rack Servers", (Oct. 31, 2009) date identified by Google, Techwalla, from https://www.techwalla.com/articles/blade-servers-vs-rack-servers.
Parent, K., "Server Consolidation in a Validated Environment", (Aug. 4, 2005), White Paper, Pharma Manufacturing.

(56) References Cited

OTHER PUBLICATIONS

Cisco, "Newer Cisco SBA Guides Available", (Feb. 2011), Cisco Systems, Inc., from http://icon.zhiding.cn/cisco/solution/iba_dc_ucs-c_vmware_deployment_guide.pdf.
Hess, K., "Blades vs. standard racked servers for virtualization", (May 23, 2012), ZDNet, from https://www.zdnet.com/article/blades-vs-standard-racked-servers-for-virtualization/.
VMware, "VMware Infrastructure Architecture Overview", White Paper, (Jun. 14, 2006) date captured by Archive.org.
Non-Final Office Action dated Oct. 3, 2019 for related U.S. Appl. No. 15/714,880.
Notice of Allowance dated Jan. 31, 2020 for related U.S. Appl. No. 15/714,880.
Corrected Notice of Allowability dated Apr. 16, 2020 for related U.S. Appl. No. 15/714,880.
Notice of Allowance dated Apr. 10, 2020 for related U.S. Appl. No. 16/535,905.
Non-Final Office Action dated Jul. 21, 2021 for related U.S. Appl. No. 16/947,790.
Notice of Allowance dated Dec. 14, 2021 for related U.S. Appl. No. 16/947,790.

* cited by examiner

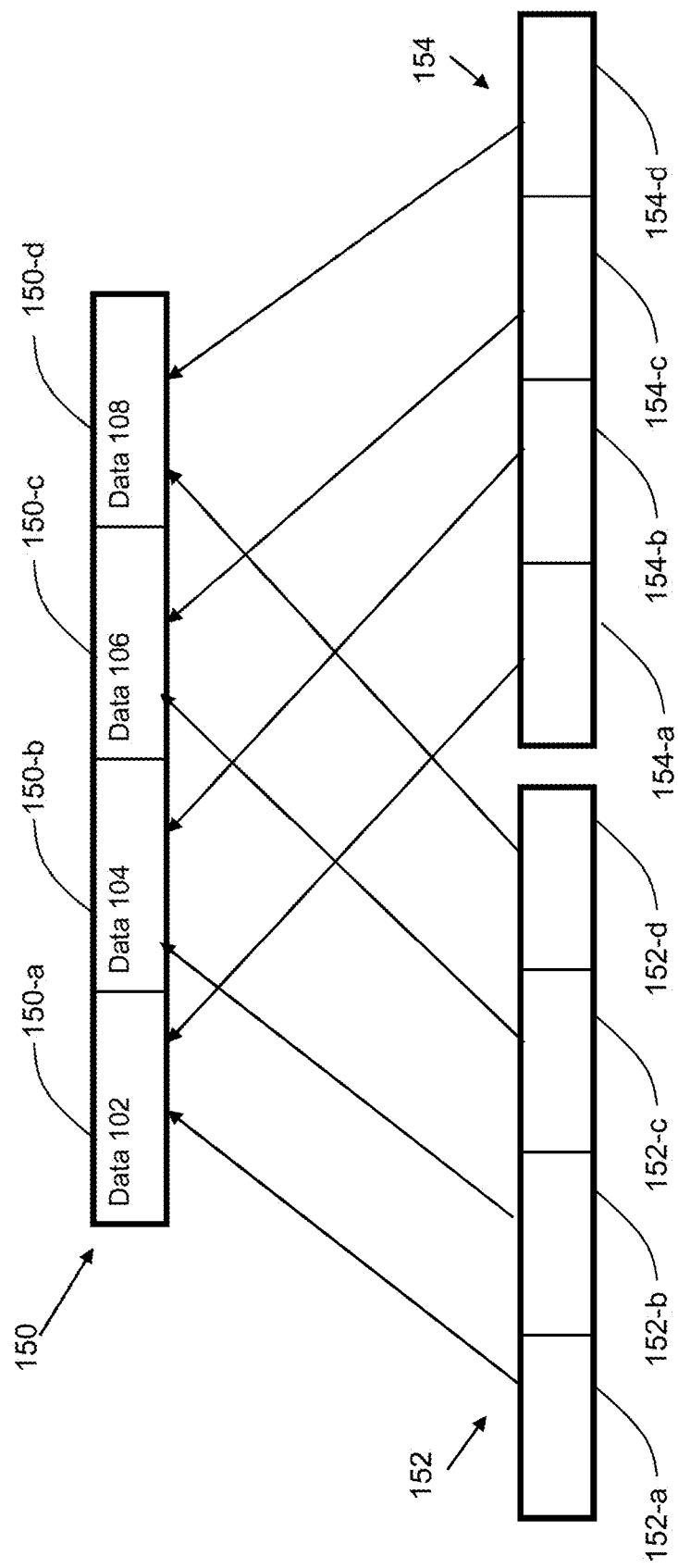

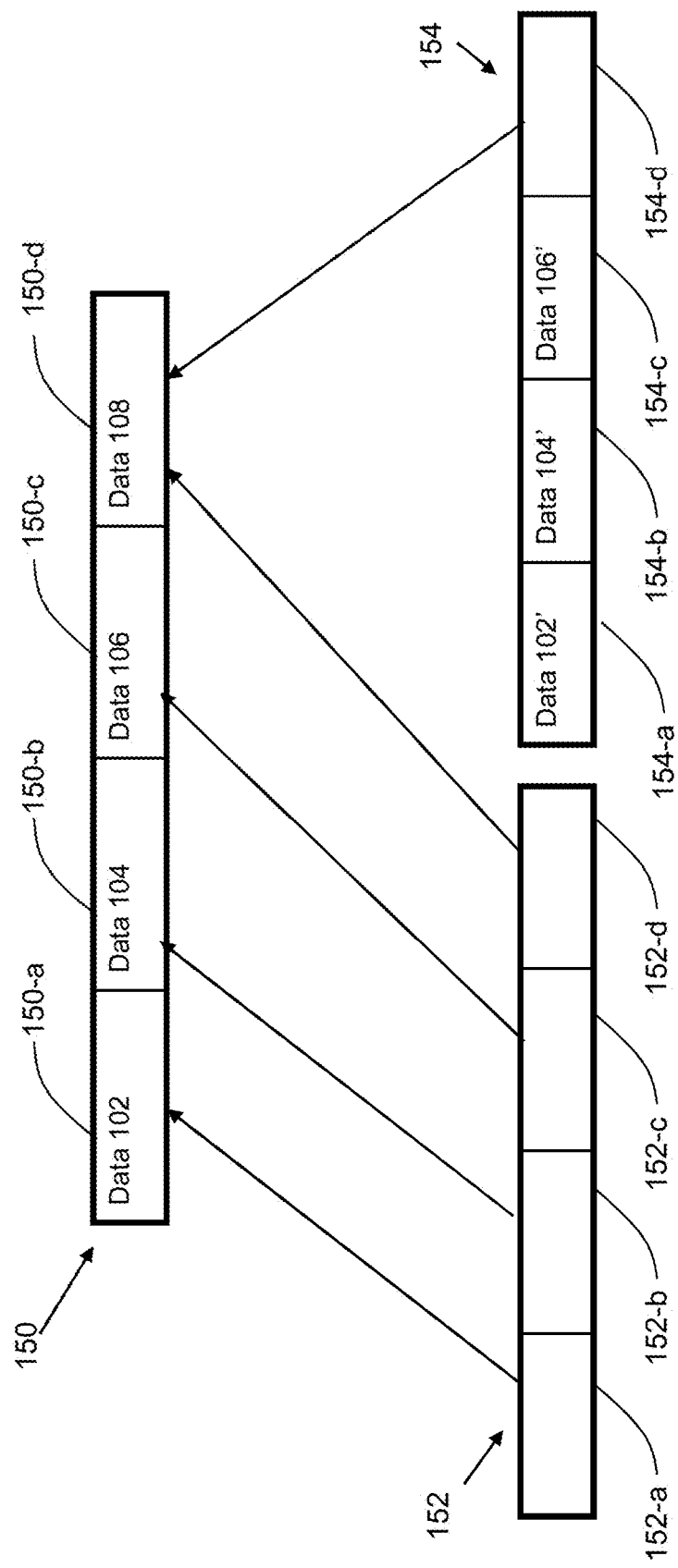

Figure 3B

| Disk Name | ID | Parent |
|---|---|---|
| Foo | 150 | |
| Foo | 152 | 150 |
| Foo2 | 154 | 150 |

Figure 3C

| Disk Name | ID | Parent |
|---|---|---|
| Foo | 152 | ~~150~~ |
| Foo2 | 154 | ~~150~~ |

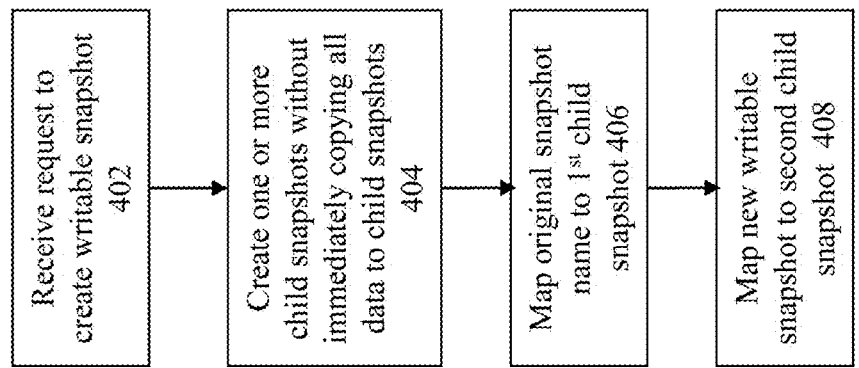

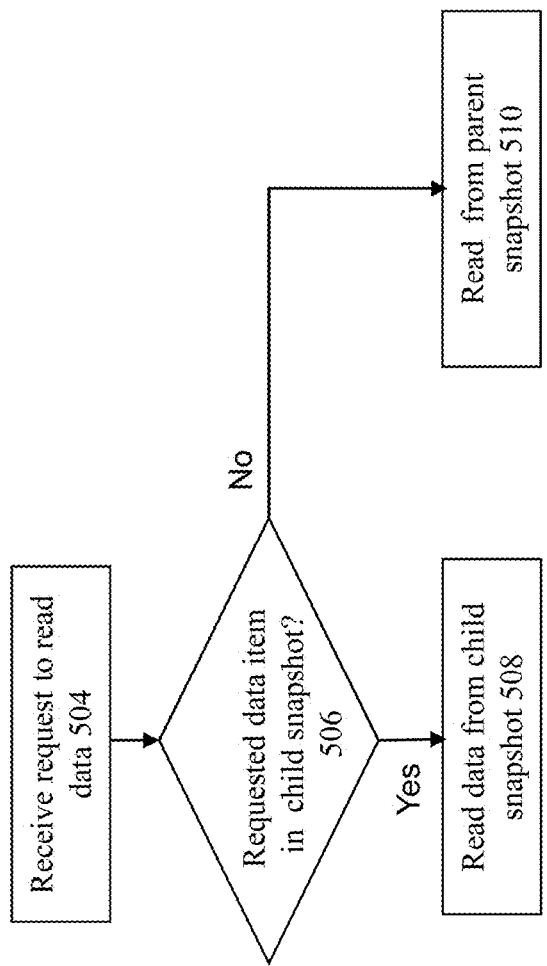

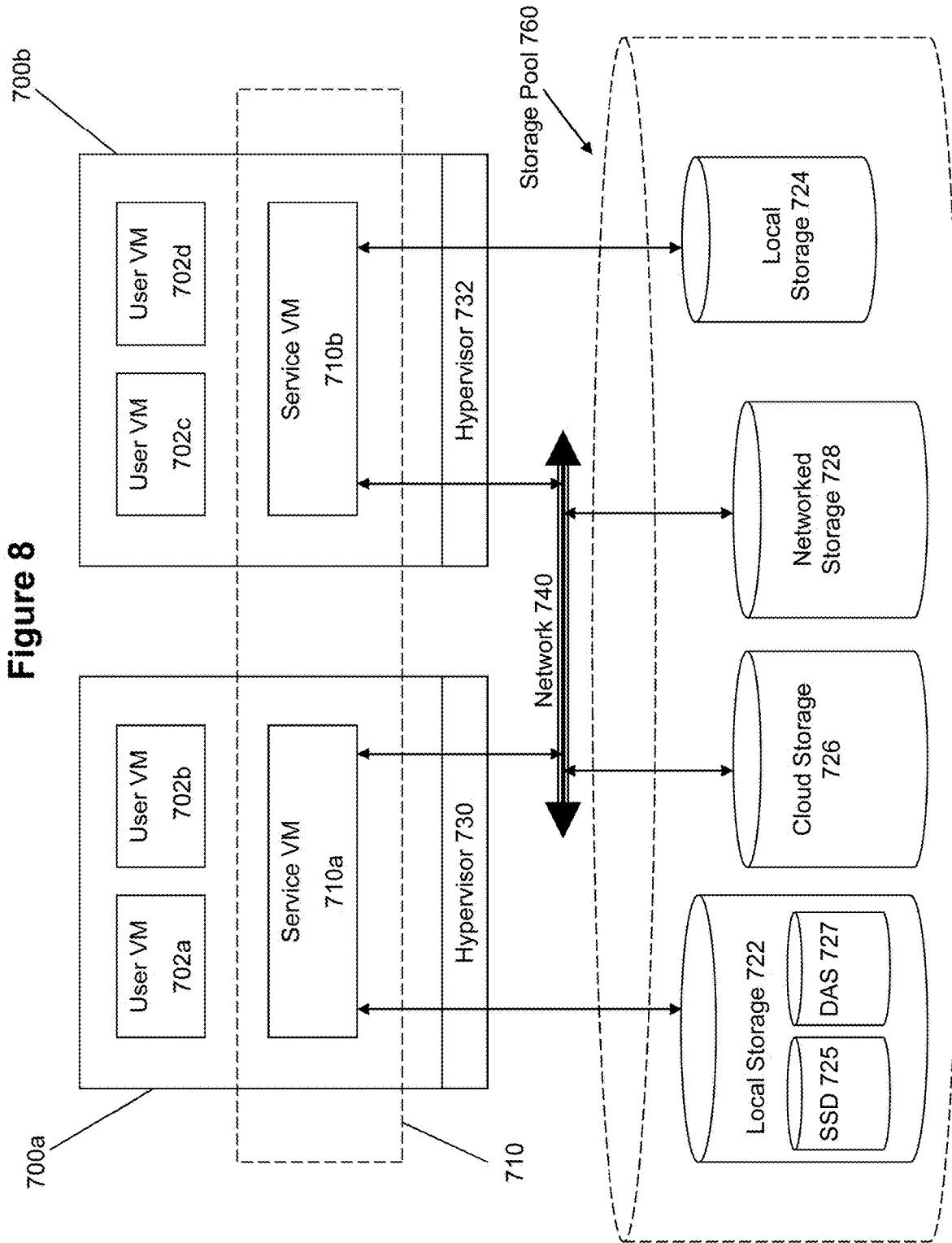

METHOD AND SYSTEM FOR IMPLEMENTING WRITABLE SNAPSHOTS IN A VIRTUALIZED STORAGE ENVIRONMENT

CROSS REFERENCE TO RELATED APPLICATIONS

The present application is a continuation application of U.S. patent application Ser. No. 14/684,901, filed on Apr. 13, 2015, now U.S. Pat. No. 10,359,952, which is a continuation application of U.S. patent application Ser. No. 13/207,371, filed on Aug. 10, 2011, now U.S. Pat. No. 9,009,106, which are hereby incorporated by reference in their entirety. The present application is related to U.S. patent application Ser. No. 13/207,345 filed on Aug. 10, 2011, now U.S. Pat. No. 8,601,473, U.S. patent application Ser. No. 13/207,357, filed Aug. 10, 2011, now U.S. Pat. No. 8,850,130, U.S. patent application Ser. No. 13/207,365, filed Aug. 10, 2011, now U.S. Pat. No. 8,549,518, and U.S. patent application Ser. No. 13/207,375, filed Aug. 10, 2011, all of which are all hereby incorporated by reference in their entirety.

FIELD

This disclosure concerns an approach for implementing writable snapshots for storage systems.

BACKGROUND

In the computer science field, a "snapshot" is a term that is used to refer to the state of a set of data at a particular point in time. There are many reasons to implement snapshots of different data. For example, it is often desirable to implement snapshots of an entire disk drive. The snapshot of the disk drive may be useful, for example, to permit distribution and/or backup of a consistent disk image across many devices in a given system or computing environment.

Many types of data and storage management systems can be used to implement snapshots. Different types of volume managers and file systems can be used to implement and maintain snapshots. Such storage management systems that may be used to implement snapshots include, for example, logical volume manager in UNIX-based systems.

Many snapshots are "read only" snapshots, in which the snapshot of the data cannot be modified. This allows for very simple management of the snapshot.

A "writable" snapshot is a type of snapshot that permits modifications to the snapshot. The user is provided the writable snapshot in such a way that the user can later perform modifications to that snapshot. For example, consider the situation in which a disk image including an operating system that is provided to a user in the form of a writable snapshot. As the user makes use of the operating system in the writable snapshot, it is likely that changes and modifications will occur to various files in the writable snapshot pertaining to the operating system, such as to files that maintain the system registry.

Once a modification is made to the snapshot, then a new variant of the snapshot is created which differs from the original snapshot. However, it is likely that both the original snapshot and the new variants of the snapshot will need to be maintained in the overall computing system. As more changes are introduced by different entities in the computing system, there will be an extending proliferation of such snapshot variants into the system.

As is evident, writable snapshots are much more complicated to maintain and administer as compared to read-only snapshots. Writable snapshots may also be much more expensive to implement, since the act of copying the data of the original writable snapshot into a new variant of the writable snapshot could end up consuming a significant amount of system resources for the computing system, and incur a significant amount of wait time for the user.

Therefore, there is a need for an efficient approach to implement and maintain writable snapshots.

SUMMARY

Embodiments of the present invention provide an approach for implementing and maintaining writable snapshots. The embodiments of the present invention provides a very efficient approach for implementing snapshots which can be used to immediately create snapshots without incurring any detectable delays in providing access to the new snapshots. For data that is not immediately copied from the parent snapshot to a child snapshot, data requests for such data are redirected to the contents of the parent snapshot. Also described are improved metadata structures that can be used to implement and maintain the writable snapshots.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIGS. 2A-2C illustrate the relationship between a parent and its child snapshots according to some embodiments of the invention.

FIGS. 3A-3C illustrate example metadata for snapshots according to some embodiments of the invention.

FIG. 4 shows a flowchart of an approach for implementing writable snapshots according to some embodiments of the invention.

FIG. 5 shows a flowchart of an approach for reading from child snapshots according to some embodiments of the invention.

FIG. 8 illustrates an example architecture to implement I/O and storage device management in a virtualization environment according to some embodiments of the invention.

DETAILED DESCRIPTION OF THE EMBODIMENTS OF THE INVENTION

Embodiments of the present invention provide an approach for implementing and maintaining writable snapshots. The embodiments of the present invention provides a very efficient approach for implementing snapshots which can be used to immediately create snapshots without incurring any detectable delays in providing access to the new snapshots. For data that is not copied from the parent snapshot to a child snapshot, data requests for such data are redirected to the contents of the parent snapshot. Also described are improved metadata structures that can be used to implement and maintain the writable snapshots, particularly for a virtualized environment (which may be interchangeably referred to herein as a "virtualization environment").

Figure 1:
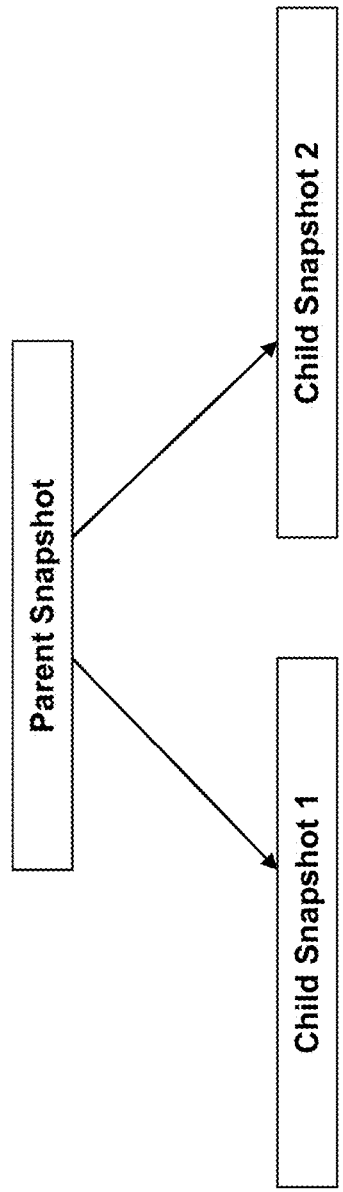
FIG. 1 illustrates a parent snapshot that is used to fork multiple child snapshots according to some embodiments of the invention.

According to some embodiments, writable snapshots are implemented by forking a parent snapshot into multiple children snapshots. This approach is conceptually illustrated in FIG. 1 which shows a parent snapshot that has been forked into two child snapshots 1 and 2. In this approach, both children snapshots 1 and 2 start off as exact copies of the parent snapshot. However, one snapshot (e.g., child 2) is designated as the "new" writable snapshot and the other (e.g., child 1) is designated as a copy of the parent snapshot that will now take the place of the parent snapshot. After the children snapshots 1 and 2 are created, future requests are no longer sent for processing to the parent snapshot. Instead, future requests for the writable snapshot are sent to the child snapshot 2 and all requests for the original snapshot are sent to the child snapshot 1.

To increase the performance of this forking process, the contents of the parent snapshot are not immediately copied to the child snapshots. Instead, the new child snapshots can be created without any perceptible delay by the user. This action may be performed by only immediately creating/copying selected metadata associated with the new child snapshots, where the full contents of the parent snapshot are not immediately copied to the child snapshots. The metadata is the information that allows the computing system to know about the existence of the new snapshots. The metadata also provides information regarding the parent snapshot, so that any data requests for data within the child snapshot can be redirected to the parent snapshot if the requested data had not yet been copied or created into the child snapshot. For example, configuration metadata (e.g., for a virtual disk) can be quickly and immediately created for the child snapshot (as opposed to, for example, mapping metadata for the blocks of the virtual disk which may not need to be created/copied immediately). Some or all of the content of the parent snapshot is not copied right away into the child snapshot, unless it is immediately needed, e.g., in order to modify that data in the child snapshot. For data within the child snapshots that have not changed, requests are actually referred to the parent snapshot.

Figure 2A:
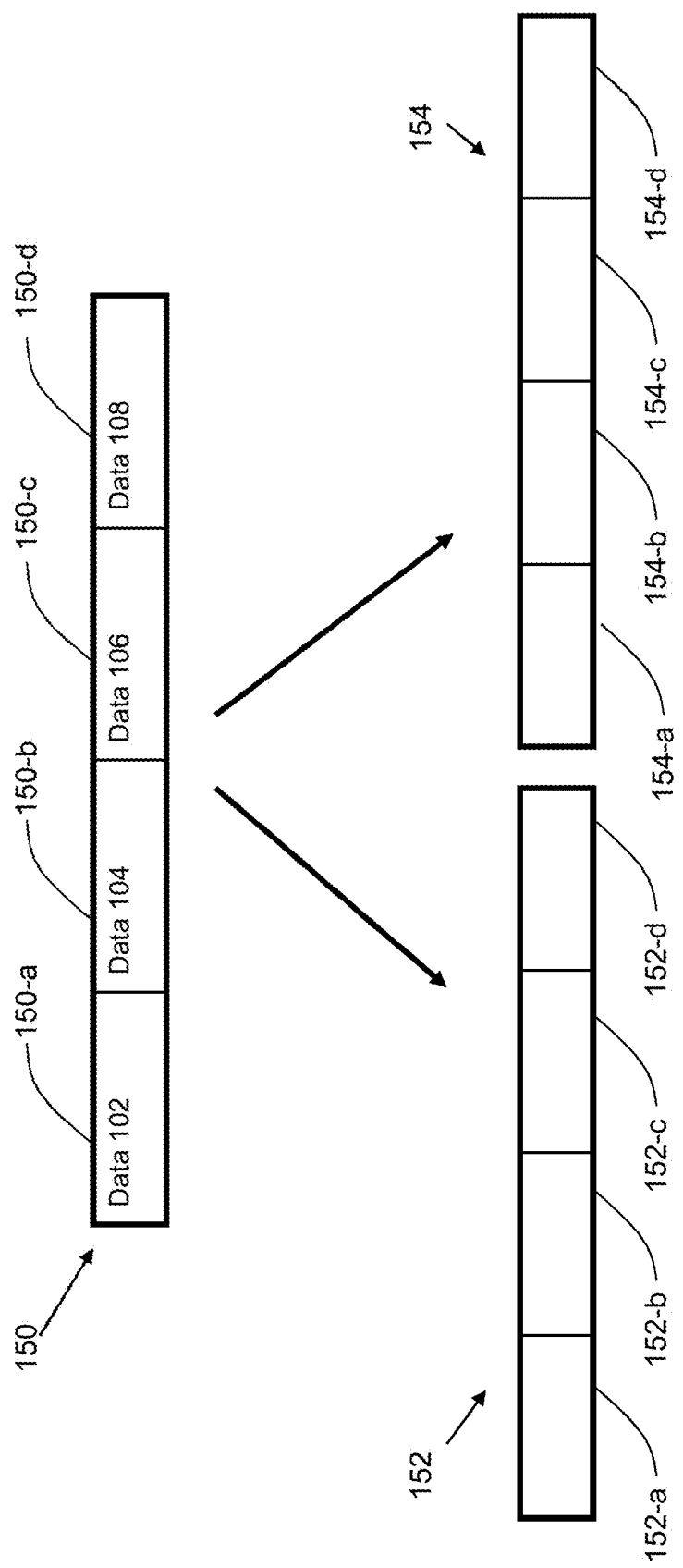

FIGS. 2A-C provide an illustrative example of this aspect of embodiments of the invention. Shown in FIG. 2A is a parent snapshot 150, which in this example is a snapshot of an entire virtual disk or "VDisk". Snapshot 150 includes four blocks of data 150-a, 150-b, 150-c, and 150-d. Block 150-a contains data 102, block 150-b contains data 104, block 150-c contains data 106, and block 150-d contains data 108. It is noted that while the illustrative examples described herein are directed to virtual disks or VDisks, the inventive principles are applicable to any type of storage unit, e.g., LUNs.

Assume that there is a request to create a writable snapshot from parent snapshot 150. To accomplish this, forking is performed to create two new child snapshots. In the present example, the new child snapshots are implemented as new snapshots 152 and 154.

Newly created snapshot 152 also includes four blocks of data—the same as its parent VDisk 150. In particular, snapshot 152 includes a first block 152-a which corresponds to block 150-a of its parent snapshot 150. Snapshot 152 also includes a block 152-b which corresponds to block 150-b, a block 152-c which corresponds to block 150-c, and block 152-d which corresponds to block 150-d of its parent snapshot 150.

In a similar manner, newly created writable snapshot 154 also includes four blocks of data, which is the same as its parent snapshot 150 and the other child snapshot 152. In particular, snapshot 154 includes a first block 154-a which corresponds to block 150-a of its parent snapshot 150. Snapshot 154 also includes a block 154-b which corresponds to block 150-b, a block 154-c which corresponds to block 150-c, and block 154-d which corresponds to block 150-d of its parent snapshot 150.

Each of the child snapshots 152 and 154 are assumed at its incipient moment of creation to be identical in its content to the contents of the parent snapshot 150. Therefore, block 152-a of snapshot 152 contains data 102—exactly the same as the contents of its corresponding block 150-a of parent snapshot 150. Similarly, block 152-b of child snapshot 152 contains data 104 which is the same as the contents of its corresponding block 150-b, block 152-c contains data 106 which is the same as the contents of its corresponding block 150-c, and block 152-d contains data 108 which is the same as the contents of its corresponding block 150-d in parent snapshot 150. Block 154-a of snapshot 154 contains data 102 which is exactly the same as the contents of its corresponding block 150-a of parent snapshot 150. In addition, block 154-b of child snapshot 152 contains data 104 which is the same as the contents of its corresponding block 150-b, block 154-c contains data 106 which is the same as the contents of its corresponding block 150-c, and block 154-d contains data 108 which is the same as the contents of its corresponding block 150-d in parent snapshot 150.

However, even though the data contents within the blocks of the child snapshots 152 and 154 start off identical to the contents within the blocks of the parent snapshot 150, the contents of the blocks in the parent snapshot are not immediately copied to the blocks in the child snapshots. Instead, as shown in FIG. 2B, any request that is made to the blocks within the child snapshot is redirected to the blocks in the parent snapshot. For example, a request that is made to obtain data item 102 in block 152-a of child snapshot 152 is redirected to block 152-a of parent snapshot 150.

It is this aspect of embodiments of the invention that allows the writable snapshots to be immediately created, without requiring the user to undergo any perceptible wait time. The present approach takes advantage of the common content between the parent and child snapshots to effectively create child snapshots without any significant negative effects on the overall system performance, since all of the data from the parent snapshot does not need to be immediately copied to the child snapshot before users can start accessing the child snapshots.

The data content explicitly stored within in the child snapshots can be populated at a later point in time. There are several possible approaches that can be taken to populate the child snapshots with actual data. One possible approach is to perform a "lazy" copy process in which the contents of the parent snapshot are copied to the child snapshots over time. For example, the system could be configured to wait until light period of system resource usage or activity, e.g. in the middle of the night (when there are less number of users using the system), to perform the copying of data from the parent snapshot to the child snapshots.

Another possible approach is to wait until there is a request to "write" or "modify" an item of data in the child snapshot. In this situation, the request will cause the data within the child snapshot to change. Depending upon the type of operation being performed to the data in the child snapshot, there may or may not be the need to perform copying from the parent snapshot to a child snapshot. For example, the requested operation may be directed to an operation that will completely or significantly overwrite the contents of a block in the child snapshot. In this situation, it does not make sense to copy the data from the parent snapshot since the data will be overwritten anyway.

On the other hand, the requested operation may only overwrite a small portion of the data in the block. In this situation, it may make sense to copy the block data from the parent snapshot to the child snapshot, and after copying the data, to modify only the portion that is to be modified by the user request. Alternatively, this situation can be handled by partitioning the block such that the unchanged portions will still be referenced to the parent snapshot, but the changed portions of the block will exist as actual data within the child snapshot.

A combination of these approaches can be taken to populate the data content within the child snapshots. Alternatively or in combination with these approaches, the system can be configured to maintain data references for data requests from the child snapshots to the parent snapshot.

In any case, it is possible for some portion of the child snapshot to contain actual data while other portions remain in a state in which data requests are referenced to the parent snapshot. This aspect of embodiments of the invention is shown in FIG. 2C, in which child snapshot 154 has undergone modifications to its data content. In particular, the data contents within blocks 154-a, 154-b, and 154-c have been modified to contain data items 102', 104', and 106', respectively. As such, these data items are now explicitly maintained within the child snapshot since these data items are no longer the same as the original data contents 102, 104, and 106 within blocks 150-a, 150-b, and 150-c, respectively, in parent snapshot 150.

However, the content of block 154-d in child snapshot 154 has not changed relative to its parent snapshot 150. Therefore, the data content 108 within this block is still exactly the same as the data content 108 within block 150-d of parent snapshot 150. In this situation, if the contents from block 150-d of the parent snapshot has not yet been copied to block 154-d of the child snapshot, then data requests for that block are still redirected to the block 150-d in the parent snapshot. If or when the content from parent block 150-d is eventually copied to child block 154-d, then at that point the data requests for data block 154-d will be serviced by the child snapshot 154 rather than the parent snapshot 150.

As noted above, metadata associated with the new snapshots are created at the time of creation for the child snapshots. The metadata is the information that allows the computing system to know about the existence of the new snapshots. The metadata also provides information regarding the parent snapshot, so that any data requests for data within the child snapshot can be redirected to the parent snapshot if the requested data had not yet been copied or created into the child snapshot.

Figure 3A:
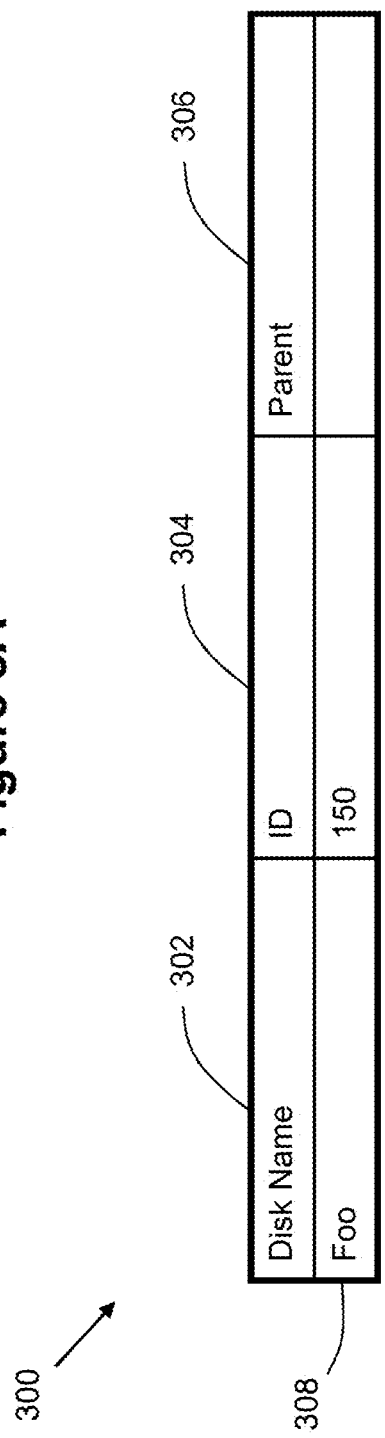

FIG. 3A shows an example set of possible metadata that can be created for new snapshots. The table 300 shown in FIG. 3 includes three columns, with a "disk name" column 302 identifying the name or identifier associated with a particular snapshot. The VDisk column 304 identifies the VDisk number or identifier of the virtual disk associated with a snapshot. The "Parent" column 306 identifies the parent VDisk/snapshot associated with a given child snapshot.

For example, with regards to the example snapshots shown in FIGS. 2A-C, row 308 can be populated to correspond to snapshot/VDisk 150. Assume that the original disk name for the parent snapshot/VDisk 150 is "Foo". Row 308 is shown as having the name "Foo" in column 302, the VDisk number "150" in column 304, and no identification of a parent in column 306 (indicating that there are no parent snapshots to 150). Prior to the creation of any child snapshots, any request for data access to a disk "Foo" is checked against metadata 300 so that the requests are directly served by VDisk 150 to handle the data operations.

At some point in time, a request was made to create a writable snapshot. At that time, the parent snapshot 150 is forked into two child snapshots as shown in FIGS. 2A-C. From a metadata perspective, this action results in creation of the data within rows 310 and 312 for the new child snapshots as shown in FIG. 3B. At this point, the parent snapshot 150 will become frozen in time, with all new data requests being handled by the new child snapshots.

Assume that the new writable snapshot is named "Foo2". Row 312 is created to correspond to the metadata for this new writable snapshot. In particular, column 302 of row 312 holds the name "Foo2" for the new writable snapshot. Column 304 identifies the VDisk number/identifier "154" for the new writable snapshot. Column 306 identifies the parent snapshot "150" for the new writable snapshot.

Since the parent snapshot 150 has been frozen in time, a new child snapshot 152 is created to handle all new requests that would have otherwise been handled by the parent snapshot. Row 310 is created to correspond to the metadata for this new snapshot. In particular, column 302 of row 310 holds the name "Foo" for the new snapshot, which is the same as the name "Foo" for the original parent snapshot from row 308 since this new child snapshot will be handling requests for the data within the parent snapshot. Therefore, column 302 for the parent row 308 will be modified so that it no longer answers to that name "Foo". Column 304 identifies the VDisk number/identifier "152" for the new child snapshot. Column 306 identifies the parent snapshot "150" for the new child snapshot.

A data request directed to the disk name "Foo" will cause a check of metadata 300 in FIG. 2B, from which a review of row 310 will cause the data request to be directed to VDisk 152. If the requested block is populated with actual data within VDisk 152, then the data request will be serviced by VDisk 152.

However, if the requested block within VDisk 152 is not yet populated with data (e.g., because the data from the parent snapshot 150 has not yet been copied to the child snapshot 152) then the parent identifier within column 306 for this VDisk's row 310 is checked to identify the parent snapshot. The identified parent snapshot 150 is then accessed to handle the data request for the data block that is not yet populated in the child snapshot.

With regard to data requests for the new writable snapshot, a data request directed to the disk name "Foo2" (name of the new writable snapshot) will cause a check of metadata 300, from which a review of row 312 will cause the data request to be directed to VDisk 154.

If the data request is a "write" or "modify" request and the requested block is populated with actual data within VDisk 154, then the data request will be handled by modifying or updating the data within the appropriate block in VDisk 154. However, if the requested block within VDisk 154 is not yet populated with data (e.g., because the data from the parent snapshot 150 has not yet been copied to the writable snapshot 154) then a determination is made whether data needs to be modified (e.g., if the data needs to be modified, then it will be copied to the child snapshot). If so, then the parent identifier within column 306 for this VDisk's row 312 is checked to identify the parent snapshot. The identified parent snapshot 150 is then accessed to copy the data from the data block that in the parent snapshot to the appropriate block in the child snapshot.

If the data request is a "read" request and the requested block is populated with actual data within VDisk 154, then the data request will be serviced by VDisk 154. However, if the requested block within VDisk 154 is not yet populated with data (e.g., because the data from the parent snapshot 150 has not yet been copied to the writable snapshot 154) then the parent identifier within column 306 for this VDisk's row 312 is checked to identify the parent snapshot. The identified parent snapshot 150 is then accessed to handle the data request for the data block that is not yet populated in the child snapshot.

Once all of the data from the parent snapshot 150 has been copied to the child snapshots 152 and 154, then there is no longer any need to reference the parent snapshot. As shown in FIG. 3C, this means that the parent-referencing information in column 306 for rows 310 and 312 can be removed.

FIG. 4 shows a high-level flowchart of an approach for implementing writable snapshots according to some embodiments of the invention. At 402, a request is received to create a new writable snapshot.

At 404, one or more child snapshots are created that correspond to the parent snapshot. The child snapshots are created without copying any of the data from the parent snapshot to the child snapshots. Instead, data requests to the child snapshots are fulfilled by redirecting the data requests to the parent snapshot, to the extent that the requested data does not exist in the child snapshot. Metadata is created which is used to redirect the data request to the parent snapshot. In some embodiments, only a single child snapshot is created immediately, where additional child snapshots are created as needed at a later point in time. In an alternate embodiment, multiple child snapshots are created immediately, where one of the child snapshots is made to act as the new parent snapshot.

At 406, one of the newly created child snapshots is mapped to the original snapshot. This is accomplished, for example, by associating the new child snapshot to the same name as the parent snapshot and disassociating the parent snapshot from that name. For example, the child snapshots can be assigned to the name that was previously associated with the parent snapshot. In effect, the parent snapshot has now been frozen in time as of the point in which the child snapshots have been created. All future data requests to the name associated with the parent snapshot will now be serviced by the child snapshot, with the exception of data requests that are redirected to the parent snapshot for data that has not yet been copied to the child snapshot.

At 408, the other newly created snapshot is mapped as the new writable snapshot. A new snapshot name is assigned to the new writable snapshot so that all future data requests for the writable snapshot is appropriated directed to the correct new snapshot. For example, consider if the invention is utilized in a system that employs SCSI or iSCSI identifiers to address storage units. In this situation, the new writable snapshot can be assigned to a new SCSI or iSCSI identifier that is different form the parent identifier.

FIG. 5 shows a flowchart of an approach for reading from the child snapshots according to some embodiments of the invention. At 504, a request is received to read a data item from the child snapshot.

At 506, a determination is made whether the data item exists in the child snapshot. It is possible that the data item does not exist in the child snapshot since the data item has not yet been copied from the parent snapshot to the child snapshot. However, it is also possible that a previous write request has already introduced the data item (e.g., data extent or block) to the child snapshot, or a previous background copy process has already copied the data item from the parent snapshot to the child snapshot.

If the data item exists in the child snapshot, then at 508, the data request is fulfilled from the appropriate storage location (e.g., block) in the child snapshot. On the other hand, if the data item does not exist in the child snapshot, then at 510, the data request is redirected to the appropriate location in the parent snapshot to obtain the data item.

Figure 6:
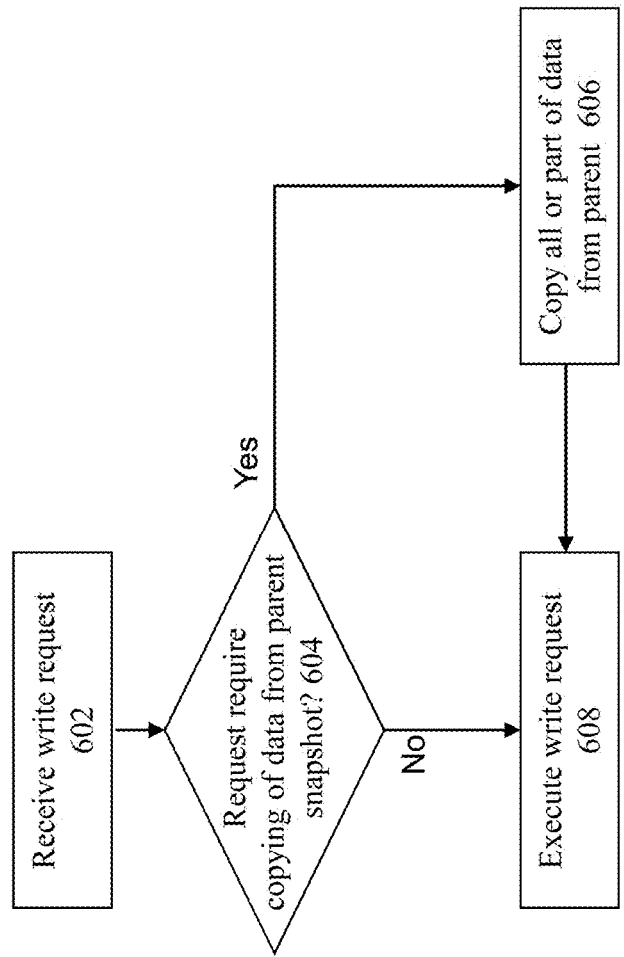
FIG. 6 shows a flowchart of an approach for writing to child snapshots according to some embodiments of the invention.

FIG. 6 shows a flowchart of an approach to handle write requests to a writable snapshot according to some embodiments of the invention. At 602, a request is received to write data into a portion of a writable snapshot.

At 604, a determination is made whether the write request will require some item of data to be copied from the parent snapshot to the writable child snapshot. For example, it is possible that the write request will require the data item to exist in the writable snapshot, but that data item does not yet exist in the child writable snapshot since the data item has not been copied from the parent snapshot to the child snapshot. However, it is also possible that the write request will not need to have the data item copied from the parent snapshot to the child snapshot, e.g., because the write request will essentially overwrite the entire contents of that data item or because a previous write request has already caused that data item to exist in the child snapshot.

If the write request will require copying to occur, then at 606, some or all of the data item is copied from the parent snapshot to the child snapshot. For example, consider if the write request is being made to a block within a virtual disk of the writable snapshot. One approach to perform the copying is to copy the entire block from the parent snapshot to the child snapshot. Another possible approach is to copy only the portions of the block that needs to be copied to fulfill the write request, but allow other portions of the block to remain un-copied, with future read requests for the un-copied portions of the block to be redirected to the parent snapshot.

At 608, the write request is then fulfilled by accessing the writable child snapshot. By performing this write request, the data item addressed by the write request will now exist in the writable snapshot, so that future data requests for that same data item can be directly fulfilled by accessing the writable snapshot rather than redirecting the future requests to the parent snapshot.

Figure 7A:
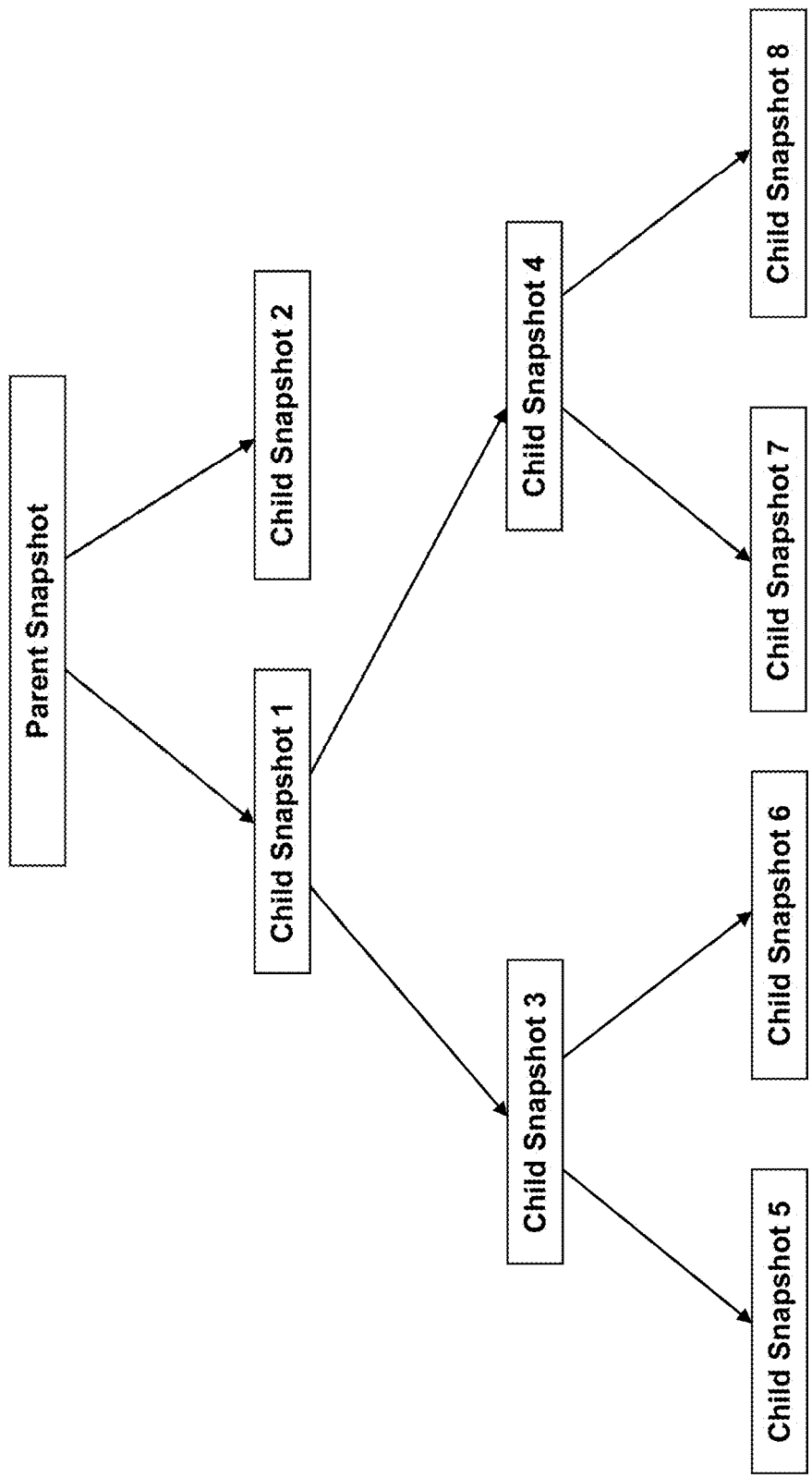
FIG. 7A-7B illustrate hierarchies of parent and child snapshots according to some embodiments of the invention.
Figure 7B:
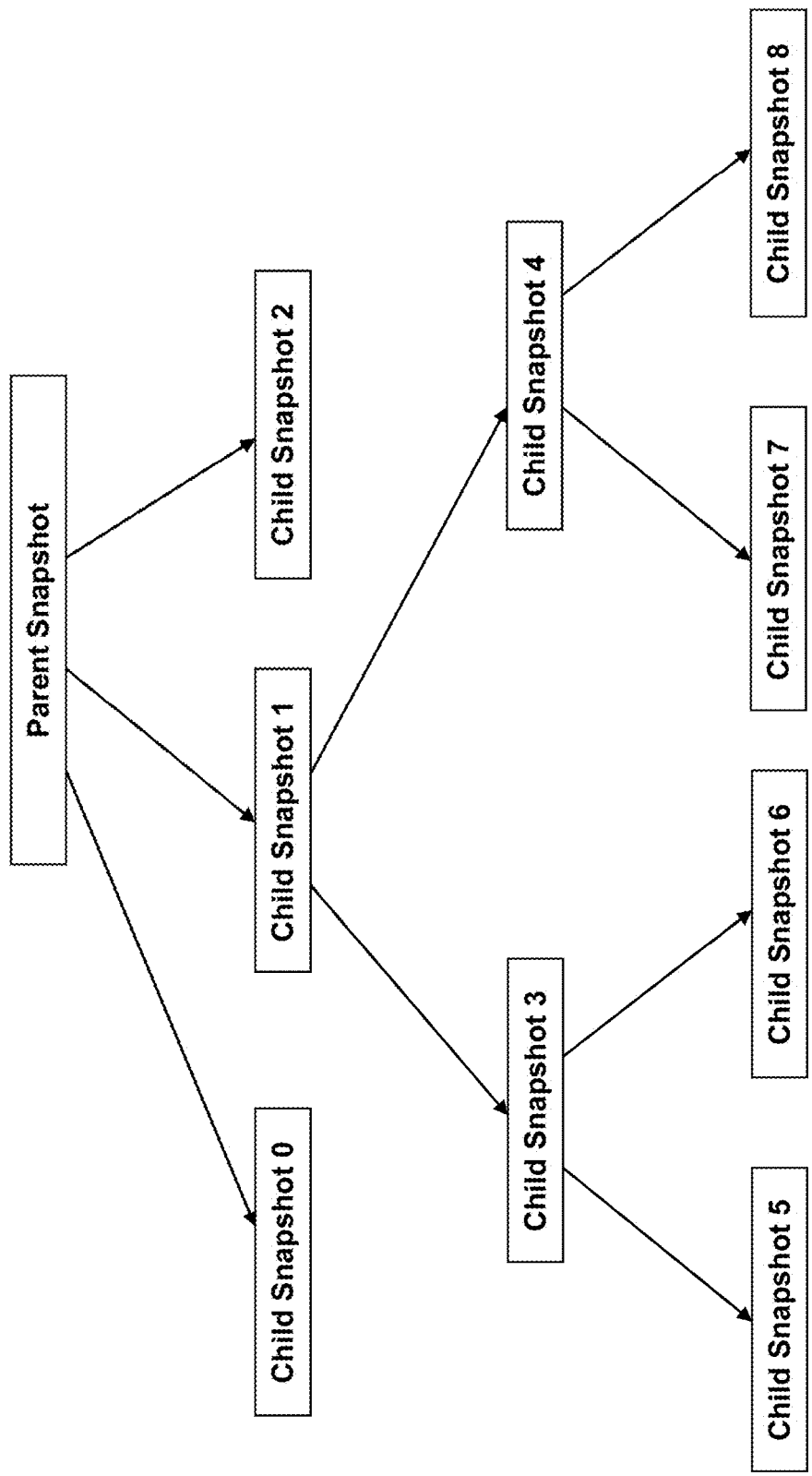

It is noted that the present embodiment of the invention can be applied to create a lengthy chain of child snapshots, since every snapshot is capable of being replicated to create yet another generation of writable snapshots. This situation is illustrated in FIG. 7A, in which the earliest parent snapshot is forked to create child snapshots 1 and 2. Child snapshot 1 is forked at a later point in time to create child snapshots 3 and 4. Each of these snapshots is forked yet again so that child snapshot 3 becomes a parent to child snapshots 5 and 6 and child snapshot 4 becomes a parent snapshot to child snapshots 7 and 8. FIG. 7B shows an alternate chain of child snapshots in which there may be any number of child snapshots 0, 1, and 2 that extend from a single parent snapshot.

The above approach of redirecting data requests from a child snapshot to a parent snapshot applies to any number of tiers of snapshots. Therefore, it is possible that a data request made to child snapshot 5 may be redirected to its parent snapshot 3 if the requested data item has not been copied to snapshot 5. However, if the data item has likewise not been copied to snapshot 3, then the data request may additionally be redirected upwards to the parent snapshot of snapshot 3, which is snapshot 1. The redirection process continues until the data request can be fulfilled by a suitable ancestor snapshot that contains an actual copy of the requested data item.

If the chain of parent and child snapshots becomes too lengthy, then the chain can be broken by deleting earlier parent snapshots. This can be accomplished by ensuring that the contents of the parent snapshots are copied to child snapshots in their entirety. Once the contents of the parent snapshots have been fully copied, then there is no longer any need to maintain those parent snapshots. At that time, the parent snapshots can be removed.

The present invention can be applied to implement writable snapshots for storage clusters where multiple nodes/disks interoperate as if on a common set of storage. In this situation, it is not sufficient to just take a snapshot of a single VDisk. Instead, a clustered snapshot is needed to address the multiple nodes of the cluster.

The clustered snapshot is implemented by making sure each node in the cluster temporarily stops processing during the snapshot process. Once the nodes have temporarily stopped processing, then each node within the cluster is individually processed for snapshots as described above. Once the new clustered snapshot has been created, then the temporary hold is lifted and the nodes in the cluster can continue their previous processing.

Illustrative Example of Writable Snapshots for Virtualization Environment

The present invention may be applied to any suitable computing or storage environment. A particular example of a suitable storage environment to which the invention may be applied is in the context of a storage management system for a virtualization environment. A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer. The following description will explain how some embodiments of the invention may be applied to implement snapshots for a particular type of virtualization environment.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them. Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Storage devices comprise one type of physical resources that can be managed and utilized in a virtualization environment. FIG. 8 illustrates an architecture for implementing storage management in a virtualization environment according to some embodiments of the invention. The architecture of FIG. 8 can be implemented for a distributed platform that contains multiple servers 700a and 700b that manages multiple-tiers of storage. The multiple tiers of storage includes storage that is accessible through a network 140, such as cloud storage 726 or networked storage 728 (e.g., a SAN or "storage area network"). The present embodiment also permits management of local storage 722/724 that is within or directly attached to the server and/or appliance. Examples of such storage include SSDs 725 or HDDs ("Hard disk drives") 727. These collected storage devices, both local and networked, form a storage pool 760. Virtual disks can be structured from the storage devices in the storage pool 760, as described in more detail below. Each server 700a or 700b runs virtualization software, such as the ESX product available from VMWare. The virtualization software includes a hypervisor 730/732 to manage the interactions between the underlying hardware and the one or more user VMs 702a, 702b, 702c, and 702d that run client software.

A special VM 710a/710b is used to manage storage and I/O activities according to some embodiment of the invention, which is referred to herein as a "Service VM". The Service VMs 710a/710b implements a storage controller in user space on the various servers 710a and 710b, and work together to form a distributed system 710 that manages all the storage resources, including the locally attached storage 722/724, the networked storage 728, and the cloud storage 726.

Each Service VM 710a-b exports one or more virtual disks that appear as disks to the client VMs 702a-d. This is exposed either as an iSCSI LUN or an NFS file. These disks are virtual, since they are implemented by the software running inside the Service VMs 710a-b. Thus, to the user VMs 702a-d, the Service VMs 710a-b appear to be acting as a clustered storage appliance that exports virtual disks. All user data (including the operating system) in the client VMs 702a-d resides on these virtual disks.

Significant performance advantages can be gained by allowing the virtualization system to access and utilize local storage 722 as disclosed herein. This is because I/O performance is typically much faster when performing access to local storage 722 as compared to performing access to networked storage 728 across a network 740. This faster performance for locally attached storage 722 can be increased even further by using certain types of optimized local storage devices, such as SSDs 725.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 722. On the other hand, data that does not require fast access or which is accessed infrequently can be stored in the networked storage devices 728 or in cloud storage 726.

Yet another advantage of the present embodiment of the invention is that storage-related optimizations for access and storage of data can be implemented directly within the primary storage path. For example, in some embodiments of the invention, the Service VM 710a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression.

According to some embodiments, the service VM runs the Linux operating system. The service VM exports a virtual disk to the user VMs.

Figure 9:
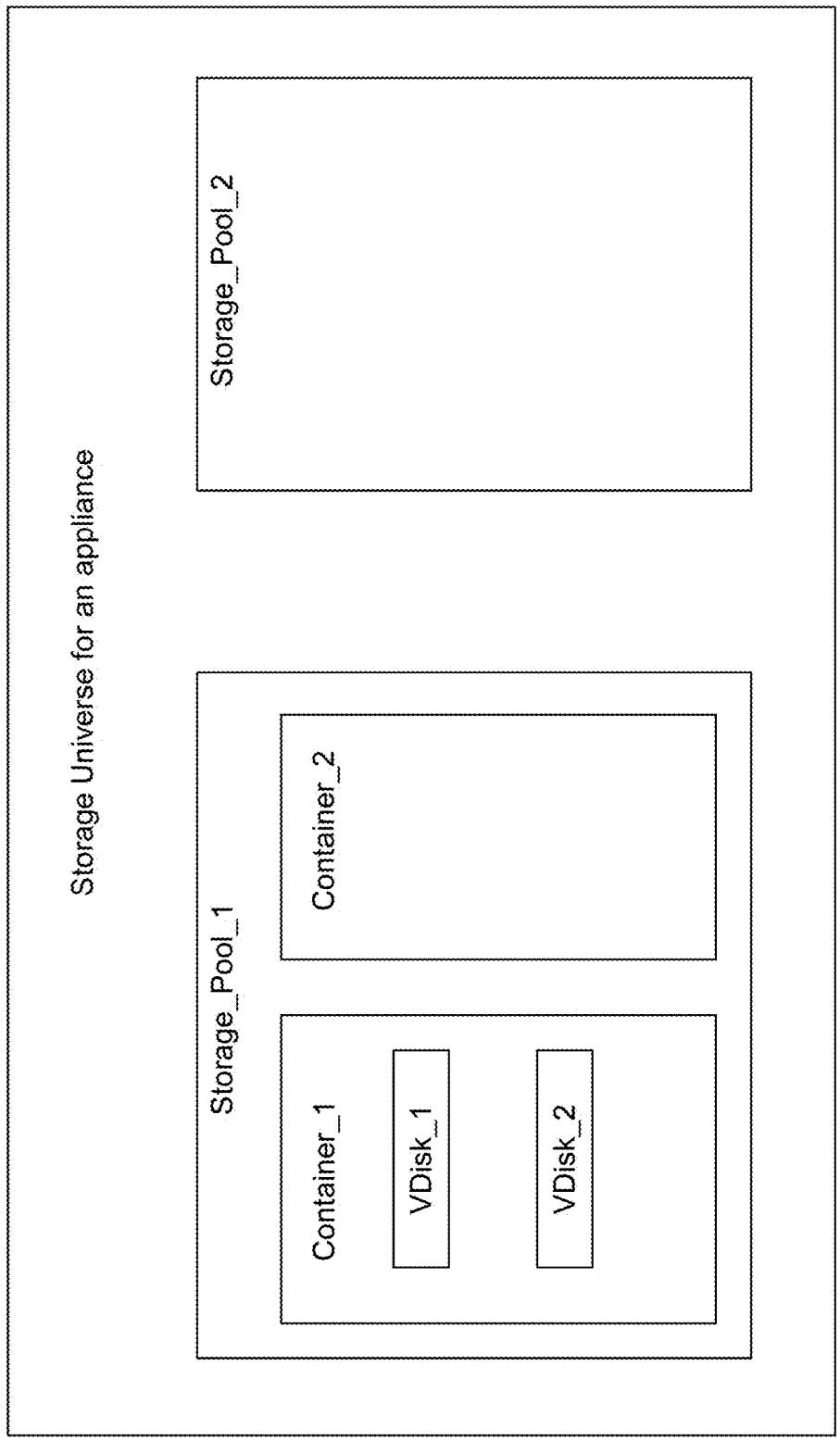
FIG. 9 illustrates a storage hierarchy according to some embodiments of the invention.

For easy management of the appliance, the storage is divided up into abstractions that have a hierarchical relationship to each other. FIG. 9 illustrates the storage hierarchy of the storage objects according to some embodiments of the invention, where all storage in the storage appliance collectively forms a Storage Universe. These storage devices may encompass any suitable devices, such as server-internal SSDs and HDDs, and network-attached SAN or Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make just one storage pool with all the disks in the storage universe in that pool. However, the principal idea behind dividing up the storage universe is to provide mutual exclusion when accessing the disk resources.

This may be one approach that can be taken to implement QoS techniques. For example, one rogue user may result in lots of random IO activity on a hard disk—thus if other users are doing sequential TO, they still might get hurt by the rogue user. Enforcing exclusion through storage pools might be used to provide hard guarantees for premium users. Another reason to use a storage pool might be to reserve some disks for later use.

In some embodiments, the container abstraction specifies a de-duplication domain. That is, all de-duplication is done for data stored within a container. Data in different containers is not de-duplicated even if it is the same. A container is assigned one or more storage pools—this defines the disks where the data for that container will be stored. A container supports several configuration parameters that determine how the data on that container is treated, including for example:

1. Replication factor: All data in a container is replicated based on this replication factor. Replicas are placed on different servers whenever possible.
2. Erasure code parameters: While all data is written initially based on the specified replication factor, it may be converted later to use erasure coding (e.g., Reed Solomon encoding) to further save on storage capacity. The data contraction policy on the VDisks enforces when the data is converted to use the erasure encoding.
3. Encryption type: All data in a container is encrypted based on the specified encryption policy if any.
4. Compression type: Data in a container is compressed based on the given compression type. However, when to compress is a policy that's specified on individual VDisks assigned to a container. That is, compression may be done inline, or it may be done offline. See the VDisk configuration parameters in the next subsection.
5. Max capacity: This parameter specifies the max total disk capacity to be used in each tier in the assigned storage pools.
6. Min reserved capacity (specified for each tier): This parameter is also specified for each tier in the assigned storage pools. It reserves a certain amount of disk space on each tier for this container. This ensures that that disk space would be available for use for this container irrespective of the usage by other containers.
7. Min total reserved capacity: This is the minimum reserved across all tiers. This value should be greater than or equal to the sum of the min reserved capacity per tier values.
8. Max de-duplication extent size: The Rabin fingerprinting algorithm breaks up a contiguous space of data into variable sized extents for the purpose of de-duplication. This parameter determines the max size of such extents.
9. Stripe width: To get high disk bandwidth, it is important to stripe data over several disks. The stripe width dictates the number of extents corresponding to a contiguous VDisk address space that'll be put in a single extent group.
10. Tier ordering: All tiers in the assigned storage pools are ordered relative to each other. Hot data is placed in the tier highest up in the order and migrated to other tiers later based on the ILM ("Information Lifecycle Management") policy. A different tier ordering may be specified for random IO as opposed to sequential IO. Thus, one may want to migrate data to the SSD tier only for random IO and not for sequential IO.

11. ILM policy: The ILM policy dictates when data is migrated from one tier to the tier next in the tier ordering. For example, this migration may start when a given tier is more than 90% full or when the data on that tier is more than X days old.

VDisks are the virtual disks that are exported to user VMs by the Service VMs. A VDisk is a software abstraction that manages an address space of S bytes where S is the size of such a virtual device. Each service VM might export multiple VDisks. A user VM might access several VDisks. Typically, all the VDisks exported by a service VM are accessed only by the user VMs running on that server node. A VDisk is a assigned a unique container at creation time. The data in the VDisk is thus managed according to the configuration parameters set on the container. Some additional configuration parameters are specified on the VDisk itself. These are:

1. De-duplication: This specifies whether de-duplication is to be used for this VDisk. However, when de-duplication is used is determined by the data contraction policy.
2. Data contraction policy: The data contraction policy controls when de-duplication, compression, and Reed-Solomon encoding is applied (if any of them are specified). De-duplication and compression may be applied in-line or out-of-line. If out-of-line, the data contraction policy specifies the time when deduplication/compression are applied (e.g., X days). The data contraction policy may specify a different time for doing Reed-Solomon than for deduplication/compression. Note that if both deduplication and compression are specified, then data would be de-duplicated and compressed at the same time before writing to disk.
3. Min total reserved capacity: This is the minimum reserved capacity for this VDisk across all the storage tiers. The sum of all min total reserved capacity parameters for the VDisks in a container should be less than or equal to the min total reserved capacity set on the container.
4. vDisk block size: The vDisk address space is divided into equal sized blocks. It should be less than or equal to the stripe width parameter on the container. A relatively large vDisk block size (e.g., 128 KB) helps reduce the metadata that is maintained.
5. vDisk row blocks: The metadata of a vDisk are conceptually divided into rows. Each row is hash-partitioned onto one metadata server residing in some Service VM in this distributed system. This parameter controls how many blocks of this vDisk are in one row.
6. VDisk Capacity: This is the size (in bytes) of the VDisk address space. This effectively controls the size of disk that an external user VM sees.
7. QoS parameters: Each VDisk may specify a priority and a fair share. Competing IO requests from various VDisks shall be scheduled based on this priority and fair share.

As noted above, embodiments of the invention can be used to directly implement de-duplication when implementing I/O in a virtualization environment. De-duplication refers to the process of making sure that a specific data item is not excessively duplicated multiple times within a storage system. Even if there are multiple users or entities that separately perform operations to store the same data item, the de-duplication process will operate to store only a limited number of copies of the data item, but allow those multiple users/entities to jointly access the copies that are actually stored within the storage system.

In some embodiments of the invention, the basic unit of de-duplication is the extent, which is a contiguous portion of storage on a given storage device. Multiple extents can be collected together and stored within an "extent group."

The sizes of the extents and extent groups for the invention can be chosen to suit any desired performance goals. In some embodiments, the extent groups are implemented as 64 Mbyte size files. The non-deduplicated extents are created to have a much larger size than the deduplicated extents. For example, the non-deduplicated extents may be implemented with 1 Mbyte sizes and the deduplicated extents implemented with 8 Kbyte sizes. The goal of this sizing strategy is to make the deduplicated extents as small as practical to facilitate duplications while the non-deduplicated extents are made as large as practical to facilitate efficient physical I/O operations and to avoid the number of rows in the metadata from bloating.

Metadata is maintained by the set of Service VMs to track and handle the data and storage objects in the system. Each VDisk corresponds to a virtual address space forming the individual bytes exposed as a disk to user VMs. Thus, if the VDisk is of size 1 TB, the corresponding address space maintained by the invention is 1 TB. This address space is broken up into equal sized units called VDisk blocks. The Metadata is used to track and maintain the contents of the VDisks and VDisk blocks.

Figure 10:
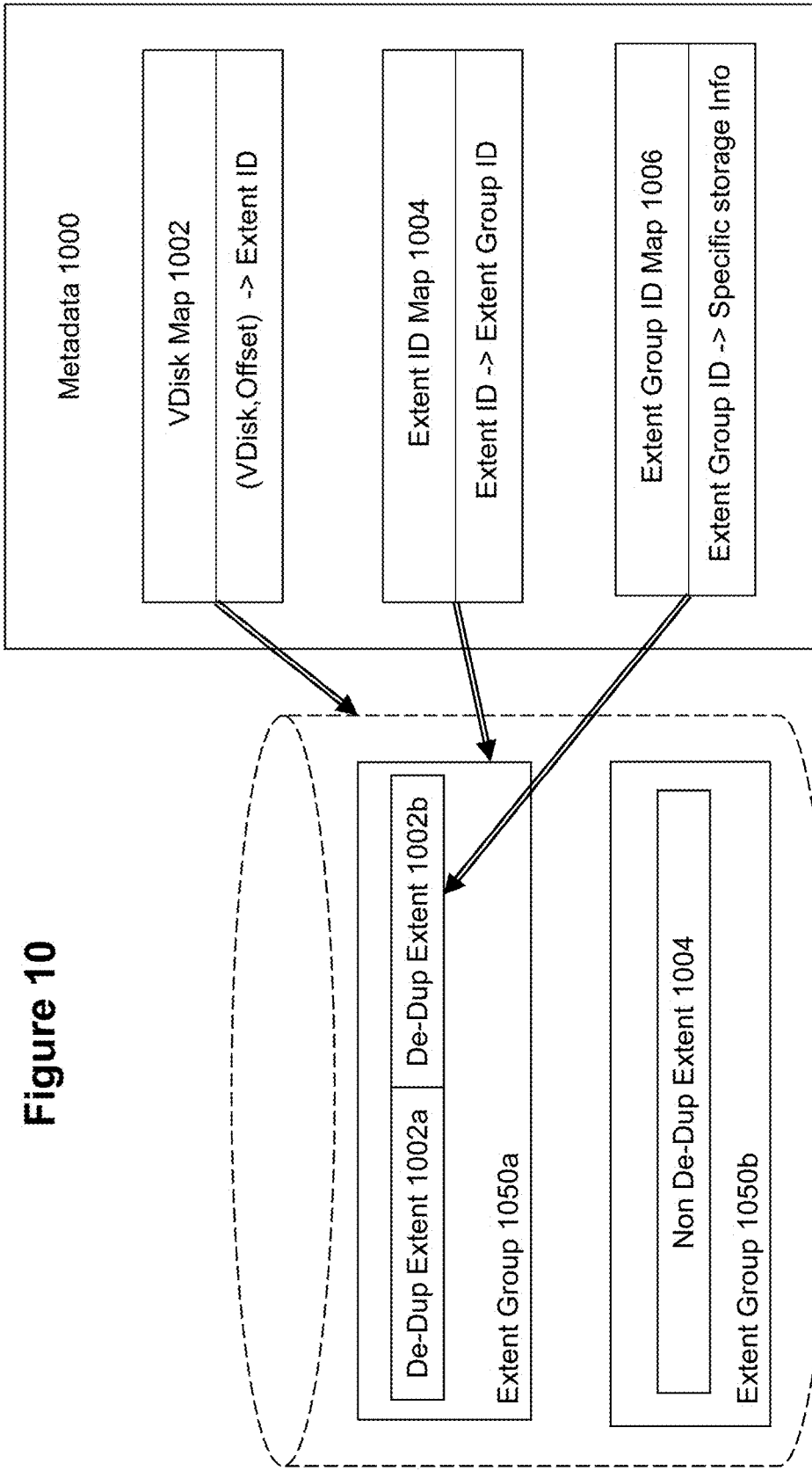
FIG. 10 illustrates metadata for implementing I/O and storage device management in a virtualization environment according to some embodiments of the invention.

As illustrated in FIG. 10, embodiments of the invention maintain three mapping structures (e.g., tables) as the metadata 1000 to track the stored data. A first metadata structure (VDisk map 1002) is used to map the VDisk address space for the stored extents. Given a specified VDisk and offset, the VDisk map 1002 can be used to identify a corresponding extent ID. A second metadata structure (extent ID map 1004) is used to map extent IDs. Given a specified extent ID, the extent ID map 1004 can be used to identify a corresponding extent group. A third metadata structure (extent group ID map 1006) is used to map specific storage information for extent group IDs. Given a specified extent group ID, the extent group ID map 1006 can be used to identify corresponding information, such as for example, (1) disk identifier for the extent group, (2) list of extent IDs in that extent group, (3) information about the extents such as ref counts, checksums, and offset locations.

The VDisk map expects the I/O request to identify a specific VDisk and an offset within that VDisk. In the present embodiment, the unit of storage is the block, whereas the unit of deduplication is the extent. Therefore, the VDisk map is basically assuming the unit of storage specified by the offset information is to a block, and then identifying the corresponding extent ID from that block, where the extent offset can be derived for within the block.

Figure 11:
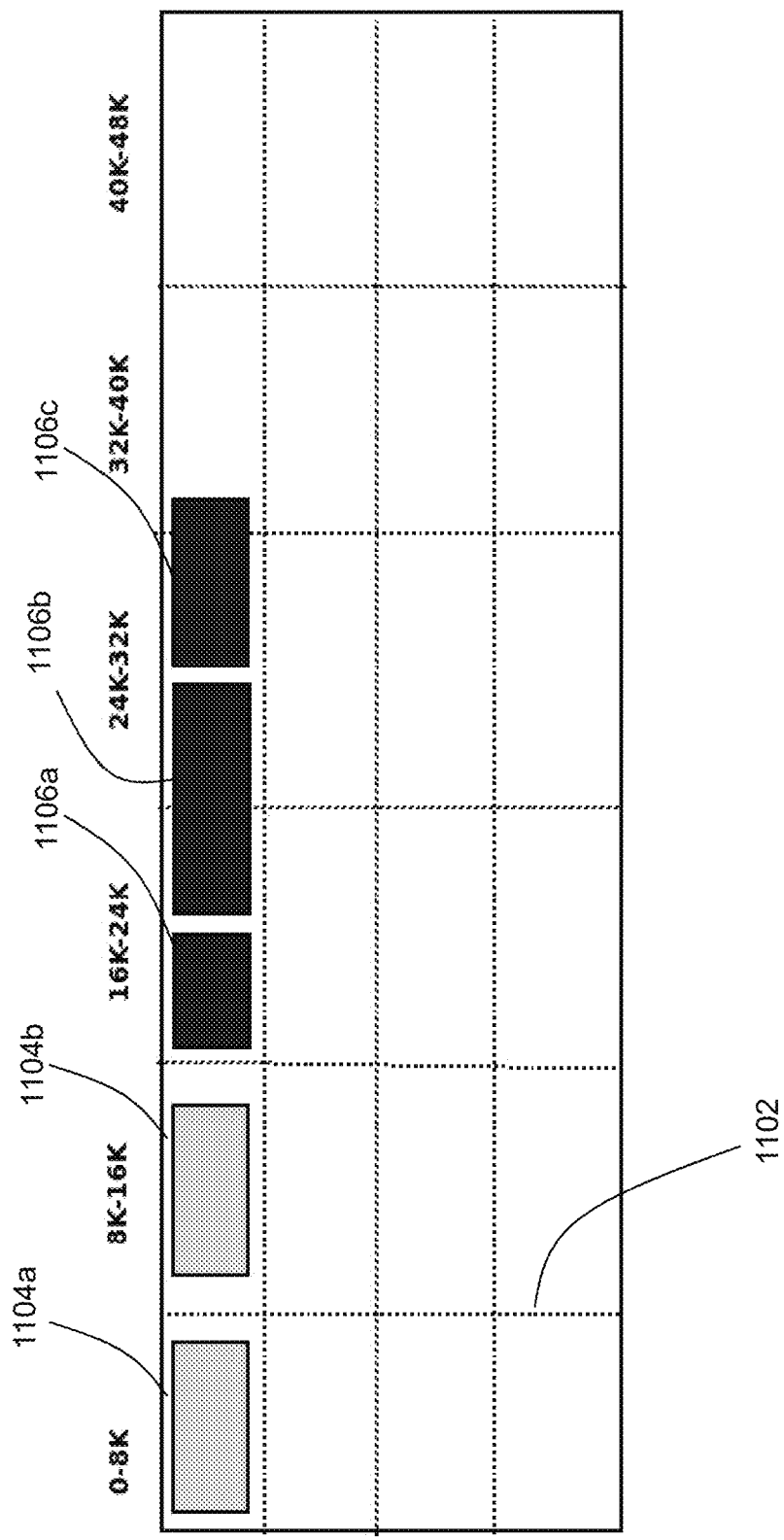
FIG. 11 illustrates block and extent structures according to some embodiments of the invention.

FIG. 11 illustrates the address space of an example VDisk according to some embodiments. The boxes 1102 with dotted boundaries indicate the VDisk blocks which are all of equal size (e.g., 8 KB in this example). The solid boxes 1104 indicate the actual extents. As noted above, extents are of two types—ones that are used during de-duplication and ones that are not. The ones that are not used during de-duplication have the same size as that of a VDisk block—the corresponding VDisk block contains exactly one of these extents (extents 1104a and 1104b in the figure). However, when an extent is used for deduplication, such an extent might be of a variable size. Such extents are shown as extents 1106*a-c* in the figure. Since these extents may not align with VDisk block boundaries, it is possible that such a VDisk block may contain more than one such extent.

The non-deduplicated extents 1104*a-b* are owned by the VDisk and can typically be updated in place. They become copy-on-write only when snapshots are taken. The de-duplication extents 406*a-c* are never updated in place.

The discretization into VDisk blocks helps store this information in a table in the VDisk map. Thus, given any random offset within the VDisk, one can discretize it using mod-arithmetic and obtain the corresponding VDisk block boundary. A lookup can be performed in the VDisk map for that (VDisk, VDisk block) combination. The information in each VDisk block is stored as a separate column in the table. A collection of VDisk blocks might be chosen to be stored in a single row—this guarantees atomic updates to that portion of the table. A table can be maintained for the address space of each VDisk. Each row of this table contains the metadata for a number of VDisk blocks (e.g., in the figure, each row contains information about 6 VDisk blocks). Each column corresponds to one VDisk block. The contents of the column contain a number of extent IDs and the offset at which they start in the VDisk block.

As noted above, a collection of extents is put together into an extent group, which is stored as a file on the physical disks. Within the extent group, the data of each of the extents is placed contiguously along with the data's checksums (e.g., for integrity checks). Each extent group is assigned a unique ID (e.g., 8 byte ID) that is unique to a container. This id is referred to as the extent group ID.

The extent ID map essentially maps an extent to the extent group that it is contained in. The extent ID map forms a separate table within the metadata—one for each container. The name of the table contains the id of the container itself. The lookup key of this table is the canonical representation of an extent ID. In some embodiments, this is either a 16 byte combination containing (VDiskID, Offset) for non-deduplicated extents, or a 24 byte representation containing (extent size, SHA1 hash) for deduplicated extents. The corresponding row in the table just contains one column—this column contains the extent Group ID where the corresponding extent is contained.

When updates are made to a VDisk address space, the existing extent is replaced by another (in case of de-duplication). Thus the old extent may get orphaned (when it is no longer referred to by any other VDisk in that container). Such extents will ultimately be garbage collected. However, one possible approach is to aggressively reclaim disk space that frees up. Thus, a "ref count" value can be associated with each extent. When this ref count drops to 0, then it can be certain that there are no other VDisks that refer this extent and therefore this extent can immediately be deleted. The ref count on a deduplicated extent may be greater than one when multiple VDisks refer to it. In addition, this may also occur when the same extent is referred to by different parts of the address space of the same VDisk. The ref count on a non-deduplicated extent may be greater than one when multiple snapshots of a VDisk refer to that extent. The ref count on an extent is stored inside the metadata for the extent group in the extent Group ID map rather than in the extent ID map. This batch updates to be made to several extents and to allow updates to a single extent Group ID metadata entry.

To reduce the number of metadata lookups, an optimization can be made for the case of non-deduplicated extents that have a ref count of one and are owned solely by the VDisk in question. In such a case, the extent ID map does not have an entry for such extents. Instead, the extent Group ID that they belong to is put in the VDisk address space map itself in the same entry where information about the corresponding VDisk block is put.

The extent Group ID map provides a mapping from an extent Group ID to the location of the replicas of that extent Group ID and also their current state. This map is maintained as a separate table per container, and is looked up with the extent Group ID as the key. The corresponding row in the table contains as many columns as the number of replicas. Each column is referenced by the unique global disk ID corresponding to the disk where that replica is placed. In some embodiments, disk IDs in the server/appliance are assigned once when the disks are prepared. After that, the disk ids are never changed. New or re-formatted disks are always given a new disk ID. The mapping from disk IDs to the servers where they reside is maintained in memory and is periodically refreshed.

An extra column can also be provided for the VDisk ID that created this extent group. This is used to enforce the property that only one VDisk ever writes to an extent group. Thus, there is never a race where multiple VDisks are trying to update the same extent group.

In some embodiments, for each replica, the following information is maintained:
a. The diskID where the replica resides.
b. A Version number.
c. A Latest Intent Sequence number. This is used for maintaining metadata consistency and is explained later in the subsequent sections.
d. The extent ids of each of the extents contained in the extent group. This is either the 8 byte offset for non-dedup extents, or 24 bytes (size, SHA1) for dedup extents. For each extent, the offset in the extentGroupID file is also contained here. Additionally a 4 byte refcount is also stored for each extent. Finally, an overall checksum is stored for each extent. This checksum is written after a write finishes and is primarily used by a disk scrubber to verify the integrity of the extent group data.
e. Information about all the tentative updates outstanding on the replica. Each tentative update carries an Intent Sequence number. It also carries the tentative version that the replica will move to if the update succeeds.

If multiple replicas share the same information, then that information will not be duplicated across the replicas. This cuts down unnecessary metadata bloat in the common case when all the replicas are the same.

At any time, multiple components in the appliance may be accessing and modifying the same metadata. Moreover, multiple related pieces of the metadata might need to be modified together. While these needs can be addressed by using a centralized lock manager and transactions, there are significant performance reasons not to use these lock-based approaches. One reason is because this type of central locking negatively affects performance since all access to metadata would need to go through the centralized lock manager. In addition, the lock manager itself would need to be made fault tolerant, which significantly complicates the design and also hurts performance. Moreover, when a component that holds a lock dies, recovering that lock becomes non-trivial. One may use a timeout, but this may result in unnecessary delays and also timing related races.

Therefore, embodiments of the present invention provide an approach that utilizes lock-free synchronization, coupled with careful sequencing of operations to maintain the consistency of the metadata. The main idea is that the order in which the metadata of FIG. 3 is accessed will differ between operations that do not change the metadata (e.g., read operations) and operations that will result in a change to the metadata (e.g., write operations).

The basic idea is that if the I/O request involves some sort of change or update to the metadata, then with regard to the three metadata maps 1002, 1004, and 1006 shown in FIG. 10, read operations should always proceed in a top-down direction starting with VDisk map 1002, then extent ID map 1004, followed by extent group ID map 1006. In contrast, write operations will proceed in the bottom-up direction starting with the extent group ID map 1006, followed by the extent ID map 1004, and then subsequently followed by the VDisk map 1002.

The reason this works is because any dangling or inconsistent references caused by a failure of the write operations in the bottom-up direction should not result in any detectable inconsistencies for the read operations that work in the top-down direction. This is because each layer of the metadata builds upon each other so that in the top-down direction, an extent ID identified from the VDisk map 302 should have a corresponding entry in the next level extent ID map 304, which in turn is used to identify an extent group ID which itself should have a corresponding entry in the extent group ID map 306.

To explain, consider first the opposite situation in which an update/write operation to the metadata is made in same direction as the read operations (i.e., in the top-down direction). Assume that the write operation successively creates an extent ID entry in the VDisk map 1002, but dies before it is able to complete the operation and therefore never has the opportunity to create an entry in the extent ID map 1004 that maps the extent ID to an extent group ID. In this situation, a subsequent read operation may possibly read that extent ID from the VDisk map 1002, but will encounter a dangling/inconsistent reference because that extent ID does not map to anything in the extent ID map 1004.

Now, consider if the update/write operation to the metadata is made in the bottom-up direction. Assume that the write operation successively creates a mapping between the extent ID and an extent group ID in the extent ID map 1004. Further assume that the operation dies before it is able to finish, and therefore never has the opportunity to create an entry in the VDisk map 1002 for the extent ID. This situation also creates a dangling reference in the extent ID map 1004. However, unlike the previous scenario, a subsequent read operation will never reach the dangling reference in the extent ID map 304 because it has to first access the VDisk map 1002, and since the previous operation did not reach this map, there is no reference to the new extent ID in the VDisk map 1002. Therefore, the subsequent read should not be able to find a path to reach the dangling reference in the extent ID map.

In this way, the present approach inherently maintains the integrity of the metadata without needing to provide any central locking schemes for that metadata. Crashes may result in some excess data, but that excess data should not result in fatal inconsistencies, and can be efficiently cleaned up by a garbage collection process at a later time.

With regard to an approach to implementing writable snapshots, the snapshots can generally be implemented as a VDisks that are tracked using the metadata 1000 shown in FIG. 10. In particular, the snapshot can correspond to an entire VDisk that corresponds to an extent group which is assigned to an extent group ID that is mapped using the extent group ID map 1006. Each child snapshot would be a replica of one or more data item(s), and for which the reference count(s) for those one or more data item(s) are maintained to account for all of the snapshot replicas in the extent group ID map 1006.

Because the snapshot encompasses an entire extent group in the present embodiment, this means that in some embodiments, the VDisk map 1002 does not need to point to a specific extent ID within the extent ID map 1004 for the snapshot. Instead, the entry for that VDisk in the VDisk map will contain a reference to the extent group ID for that VDisk. This makes access to the specific extent group for a VDisk more efficient, since this means that the process of accessing the metadata can skip the step of accessing the extent ID map 1004 to obtain an extent group ID. However, as described in more detail below, there are certain optimizations that can be implemented which will require such a mapping and usage of the extent ID map 1004 in some embodiments.

When a new writable snapshot is created, a new extent group ID is created for the writable snapshot, and a corresponding entry is made in the extent group ID map 1006. The VDisk map 1002 is also updated to associate the name of the new writable snapshot to the new extent group ID.

In operation, an I/O request is received that specifies the VDisk and offset at which the access will occur. The I/O request will also identify the number of bytes that need to be accessed (e.g., read) from that VDisk and offset. The VDisk map 1002 is accessed to identify the extent group ID that corresponds to the specified VDisk and offset. The extent group ID is used to query the extent group ID map, to gather storage information for the specified external group ID. This provides, for example, the disk ID(s) at which the extent ID is located.

If the location of the requested data item is empty within the VDisk, then the parent snapshot is accessed to retrieve the data item. This works exactly as just described, except that the name of the parent snapshot VDisk is used to perform the data access. Assuming that there is a need to replicate the data from the parent to the child VDisk, then the data retrieved from the appropriate location in the parent VDisk will be copied to the correct location in the child VDisk.

In some embodiments, it is desirable to avoid an explicit copying of data from the parent snapshot to the child snapshot. Instead of copying the entirety of the data, only the metadata is copied from the parent snapshot to the child snapshot. In this approach, only the metadata is copied from the parent to the item/block of interest in the child. In other words, the portion of the child VDisk that is supposed to contain the data item will instead only contain the extent ID and/or the VDisk/offset of the corresponding data item for the parent VDisk.

This optimization provides a significant performance improvement since much less data needs to be copied to populate the data contents of a child snapshot. Instead of having to copy the entirety of the data item, a much smaller quantity of data in the form of the metadata is copied to the child snapshot.

The potential problem with this approach is that copying of the metadata will include specific information for the data that relate to the parent snapshot, e.g., for the extent group ID information, and can end up copying extent group ID information into multiple places within the storage structures. If there is a future need to move the underlying data, then the process will need to account for changing extent group ID information in multiple places.

To address this problem, the extent group ID mapping can be maintained using the extent ID map 1004. Recall that this extent ID map 1004 can potentially not be used for writable snapshots if the snapshot encompasses an entire extent group. However, to address the present issue, the extent ID map 1004 can be used to maintain the mapping of the data contents in only a single location. Therefore, the VDisk map 1002 will be configured to map the VDisk/offset to an extent ID value. The extent ID value is used to check the extent ID map 1004 to identify the specific extent group ID corresponding to the data item. In this way, if there is a need to move the data item at a later time to another location, the corresponding metadata change can be effected by accessing the extent ID map 1004.

With regards to the lock-free processing of the metadata 1000, it is possible that special processing may need to be taken to account for the child snapshots. To explain, recall that "read" processing is performed in a top down order by first accessing the VDisk map 1002, then the extent ID map 1004, and finally the extent group ID map 1006. However, "write" and "modify" processing is performed in the other direction, so that the extent ID map 1006 is first modified, then the extent ID map 1004, and finally the VDisk map 1002.

To improve read access to the metadata, optimizations can be made to avoid excessive reading of the metadata maps. To explain, assume that there is a data request to read multiple data blocks from a given VDisk. In the normal course of events without optimization, each block would individually undergo the process of accessing each of the three maps in order to obtain the appropriate storage locations to access the underlying data.

However, it is possible that such accesses for every single block in the data request can be avoided under certain circumstances. For example, when performing this type of access for the first block in the request, it is possible that the information retrieved from the extent group ID map 1006 for that first block will also include information for subsequent blocks in the request. This is because multiple contiguous extent group ID information can be read during the processing of the first block in the request, and it is possible that the extra information that has been read will include information for other data blocks in the request. If this is the case, then this may avoid the need to perform full access of the metadata for these other blocks, particularly for avoidance of needing to access the extent ID map 1004 for these other blocks.

The problem with this approach is that unintended errors for lock-free processing may occur with respect to new snapshots. This is because one item of information stored in the extent group ID map 1006 is the reference count for snapshot, where creation of a new child snapshot will increment the reference count for the underlying extent group ID for that snapshot. However, if a crash occurs during lock free processing of the metadata, then it is possible that the reference count becomes incorrect for given extent group ID/snapshot. This is normally not a problem if the extent ID map is accessed, but could create a problem if the extent ID map is skipped during processing for the snapshot pursuant to the optimization described above, and the reference count for the data is too high.

To address this possible problem, tentative update messages are implemented for the extent ID and extent group ID maps. Before and/or during the process of adding the new child snapshot (and incrementing the reference count as a result), a tentative update message is added to the correct entry in the extent group ID map. Once that occurs, the extent ID map is correspondingly updated. Only after the extent ID map has been successfully updated will the tentative update message be removed from the extent group ID map.

Any future access to the extent ID map for the snapshot data will first check whether or not there is a tentative update message. If there is no such message, then there can be confidence that previous modification so the extent group ID data was successful for the new child snapshots. On the other hand, if such a tentative update message is found, then it is clear there was a previous error and the information in the extent group ID map cannot be trusted.

Therefore what has been described is an improved approach for implementing and maintaining writable snapshots. The embodiments of the present invention provides a very efficient approach for implementing snapshots which can be used to immediately create snapshots without incurring any detectable delays in providing access to the new snapshots. Also described are improved metadata structures that can be used to implement and maintain the writable snapshots.

System Architecture

Figure 12:
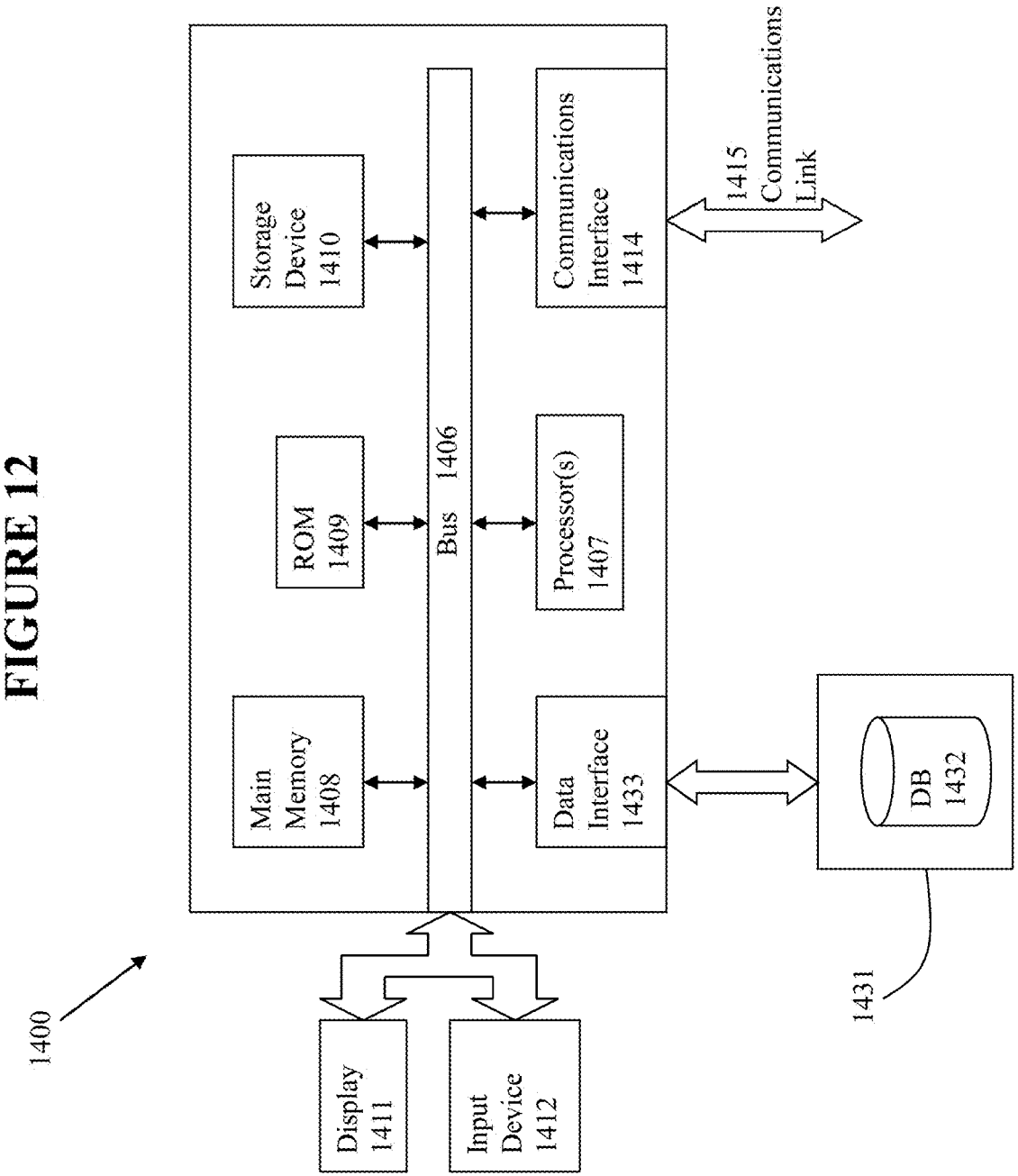
FIG. 12 is a block diagram of a computing system suitable for implementing an embodiment of the present invention.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for implementing a writable snapshot that is performed using a processor, comprising:
   identifying a parent snapshot for a virtual machine corresponding to a virtual disk mapped to a plurality of extents stored on one or more storage devices, the parent snapshot comprising data and metadata for the virtual disk;
   creating a writable child snapshot from the parent snapshot, in which the writable child snapshot is accessible in place of the parent snapshot prior to copying all of the data for the virtual disk of the parent snapshot to the writable child snapshot;
   receiving a modification request to modify at least some of the data for the virtual disk; and
   applying the modification request to the writable child snapshot by storing modified data in an extent and is placing a reference to the extent in the writable child snapshot, wherein the writable child snapshot represents a backup of a state of the virtual disk.

2. The method of claim 1 in which the plurality of extents are maintained in data blocks.

3. The method of claim 1 in which a data request for a portion of the writable child snapshot which has not been copied from the parent snapshot is redirected to the parent snapshot.

4. The method of claim 1 in which a data item is copied from the parent snapshot to the writable child snapshot upon a need to access the data item in the writable child snapshot.

5. The method of claim 4 in which a first portion of the data item exists in the writable child snapshot and a second portion of the data item is referenced to the parent snapshot.

6. The method of claim 1 in which the metadata comprises at least configuration information for the virtual machine.

7. The method of claim 1 in which the parent snapshot is deleted after contents of the parent snapshot are no longer needed.

8. A non-transitory computer readable medium having stored thereon a sequence of instructions which, when executed by a processor, causes a set of acts comprising:
   identifying a parent snapshot for a virtual machine corresponding to a virtual disk mapped to a plurality of extents stored on one or more storage devices, the parent snapshot comprising data and metadata for the virtual disk;
   creating a writable child snapshot from the parent snapshot, in which the writable child snapshot is accessible in place of the parent snapshot prior to copying all of the data for the virtual disk of the parent snapshot to the writable child snapshot;
   receiving a modification request to modify at least some of the data for the virtual disk; and
   applying the modification request to the writable child snapshot by storing modified data in an extent and is placing a reference to the extent in the writable child snapshot, wherein the writable child snapshot represents a backup of a state of the virtual disk.

9. The non-transitory computer readable medium of claim 8 in which the plurality of extents are maintained in data blocks.

10. The non-transitory computer readable medium of claim 8 in which a data request for a portion of the writable child snapshot which has not been copied from the parent snapshot is redirected to the parent snapshot.

11. The non-transitory computer readable medium of claim 8 in which a data item is copied from the parent snapshot to the writable child snapshot upon a need to access the data item in the writable child snapshot.

12. The non-transitory computer readable medium of claim 11 in which a first portion of the data item exists in the writable child snapshot and a second portion of the data item is referenced to the parent snapshot.

13. The non-transitory computer readable medium of claim 8 in which the metadata comprises at least configuration information for the virtual machine.

14. The non-transitory computer readable medium of claim 8 in which the parent snapshot is deleted after contents of the parent snapshot are no longer needed.

15. A system comprising:
   a storage medium having stored thereon a sequence of instructions; and
   a processor, wherein the sequence of instructions cause the processor to perform a set of acts, the set of acts comprising,
      identifying a parent snapshot for a virtual machine corresponding to a virtual disk mapped to a plurality of extents stored on one or more storage devices, the parent snapshot comprising data and metadata for the virtual disk;
      creating a writable child snapshot from the parent snapshot, in which the writable child snapshot is accessible in place of the parent snapshot prior to copying all of the data for the virtual disk of the parent snapshot to the writable child snapshot;
      receiving a modification request to modify at least some of the data for the virtual disk; and
      applying the modification request to the writable child snapshot by storing modified data in an extent and placing a reference to the extent in the writable child snapshot, wherein the writable child snapshot represents a backup of a state of the virtual disk.

16. The system of claim 15 in which the plurality of extents are maintained in data blocks.

17. The system of claim 15 in which a data request for a portion of the writable child snapshot which has not been copied from the parent snapshot is redirected to the parent snapshot.

18. The system of claim 15 in which a data item is copied from the parent snapshot to the writable child snapshot upon a need to access the data item in the writable child snapshot.

19. The system of claim 18 in which a first portion of the data item exists in the writable child snapshot and a second portion of the data item is referenced to the parent snapshot.

20. The system of claim 15 in which the metadata comprises at least configuration information for the virtual machine.

21. The system of claim 15 in which the parent snapshot is deleted after contents of the parent snapshot are no longer needed.

22. The method of claim 1, wherein a group of extents is allocated to a single virtual disk comprising the virtual disk.

23. The non-transitory computer readable medium of claim 8, wherein a group of extents is allocated to a single virtual disk comprising the virtual disk.

24. The system of claim 15, wherein a group of extents is allocated to a single virtual disk comprising the virtual disk.

\* \* \* \* \*